(12) United States Patent
Gentner et al.

(10) Patent No.: US 11,577,562 B2
(45) Date of Patent: Feb. 14, 2023

(54) TRAILER HITCH

(71) Applicant: ACPS Automotive GmbH, Ingersheim (DE)

(72) Inventors: Wolfgang Gentner, Steinheim (DE); Bernhard Rimmelspacher, Rheinstetten (DE); Stefan Naegele, Besigheim (DE); Aleksej Kadnikov, Leonberg (DE)

(73) Assignee: ACPS Automotive GmbH, Ingersheim (DE)

( * ) Notice: Subject to any disclaimer, the term of this patent is extended or adjusted under 35 U.S.C. 154(b) by 2 days.

(21) Appl. No.: 17/082,590

(22) Filed: Oct. 28, 2020

(65) Prior Publication Data

US 2021/0129609 A1 May 6, 2021

(30) Foreign Application Priority Data

Oct. 30, 2019 (DE) .......................... 102019129346.4

(51) Int. Cl.
 *B60D 1/54* (2006.01)
 *B60D 1/06* (2006.01)
 *B60D 1/26* (2006.01)

(52) U.S. Cl.
CPC ................. *B60D 1/54* (2013.01); *B60D 1/06* (2013.01); *B60D 1/26* (2013.01); *B60D 2001/544* (2013.01)

(58) Field of Classification Search
CPC ............. B60D 1/54; B60D 1/544; B60D 1/26
See application file for complete search history.

(56) References Cited

U.S. PATENT DOCUMENTS

| | | |
|---|---|---|
| 2002/0020988 A1 | 2/2002 | Kleb et al. |
| 2007/0007749 A1 | 1/2007 | Gentner et al. |

(Continued)

FOREIGN PATENT DOCUMENTS

| | | |
|---|---|---|
| DE | 10252722 B3 | 2/2004 |
| DE | 10329622 A1 | 1/2005 |

(Continued)

*Primary Examiner* — Kevin Hurley
(74) *Attorney, Agent, or Firm* — Reinhart Boerner Van Deuren P.C.

(57) ABSTRACT

The invention relates to a trailer hitch, comprising a ball neck, which is movable between an operative position and a rest position and has a trailer ball, a pivot bearing unit, which is arranged fixed to the vehicle, and a rotation-blocking device having at least two rotation-blocking bodies that are guided such that they are movable by means of a guide body in a guide direction having at least one component in the radial direction in relation to the pivot axis, and having an actuation body, which is arranged such that it is rotatable about the pivot axis and has a respective wedge face extending transversely to the guide direction for each of the rotation-blocking bodies and of which the rotary movement in an actuation direction causes the at least two rotation-blocking bodies to be movable and urgeable in the guide direction, wherein there is provided a release position latching device that, in a release position of the actuation body, is movable between a latch release position, which releases movement of the actuation body in relation to the guide body, and a latching position, which fixes the actuation body in relation to the guide body, and, at least in the release position of the actuation body, is urged in the direction of the latching position by a spring element.

59 Claims, 25 Drawing Sheets

(56) References Cited

U.S. PATENT DOCUMENTS

| | | | |
|---|---|---|---|
| 2017/0072753 A1 | 3/2017 | Kadnikov et al. | |
| 2018/0222263 A1 | 8/2018 | Kadnikov et al. | |
| 2021/0331539 A1* | 10/2021 | Gentner | B60D 1/246 |

FOREIGN PATENT DOCUMENTS

| | | | | |
|---|---|---|---|---|
| DE | 102005047379 A1 | | 4/2007 | |
| DE | 102014111426 A1 | | 2/2016 | |
| DE | 102015115357 A1 | | 3/2017 | |
| DE | 102017102504 A1 | | 8/2018 | |
| DE | 102018124518 A1 | | 4/2020 | |
| EP | 1504928 A1 | * | 2/2005 | B60D 1/246 |
| EP | 1741572 A1 | | 10/2007 | |
| EP | 2272692 A1 | * | 1/2011 | B60D 1/246 |
| EP | 2295268 B1 | | 3/2014 | |
| WO | WO-2021105517 A1 | * | 6/2021 | B60D 1/06 |

* cited by examiner

FIG.19
FIG.19a
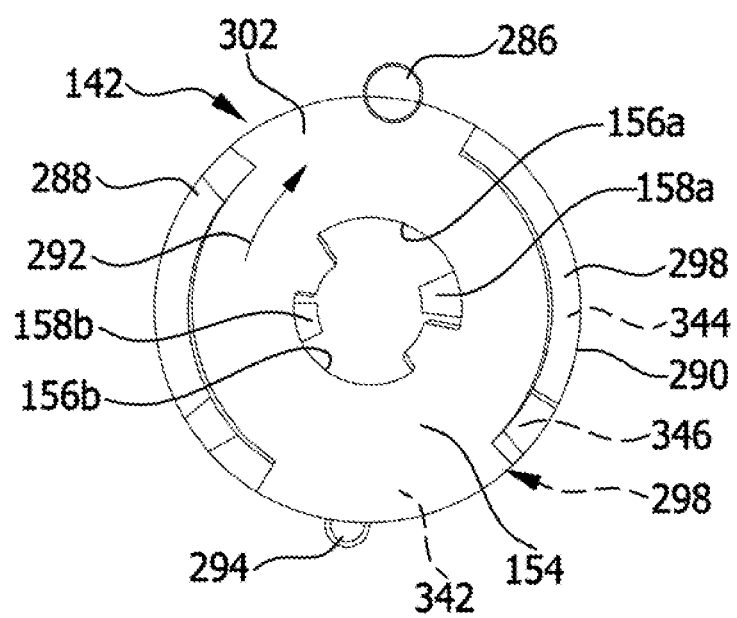
FIG.19c
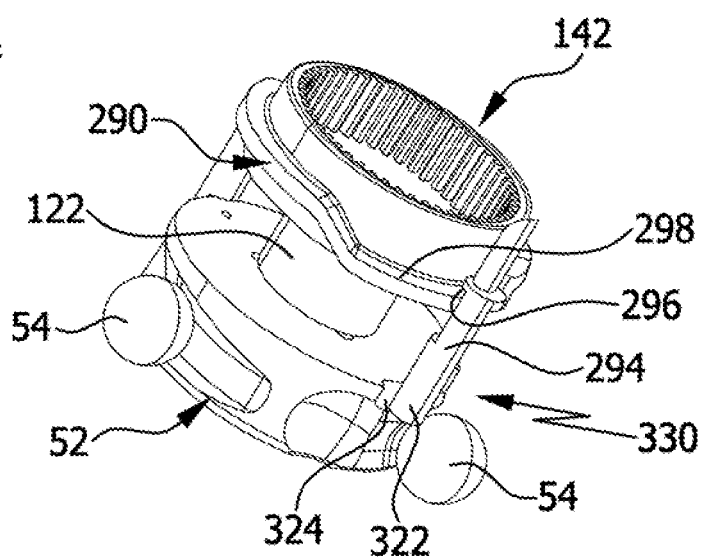
FIG.19b
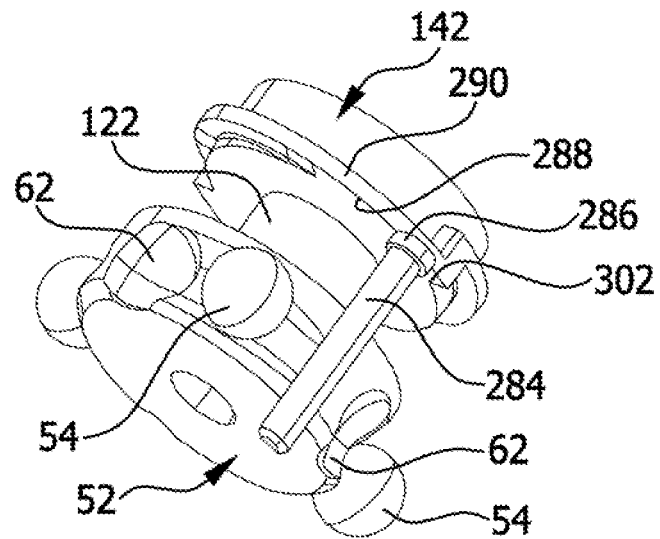

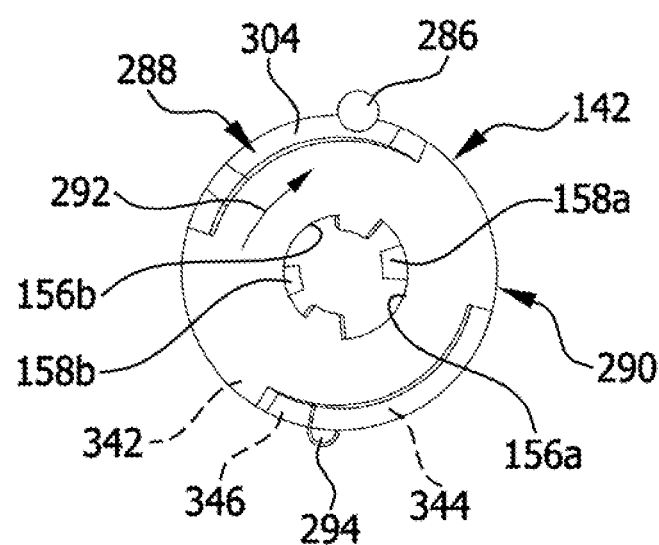
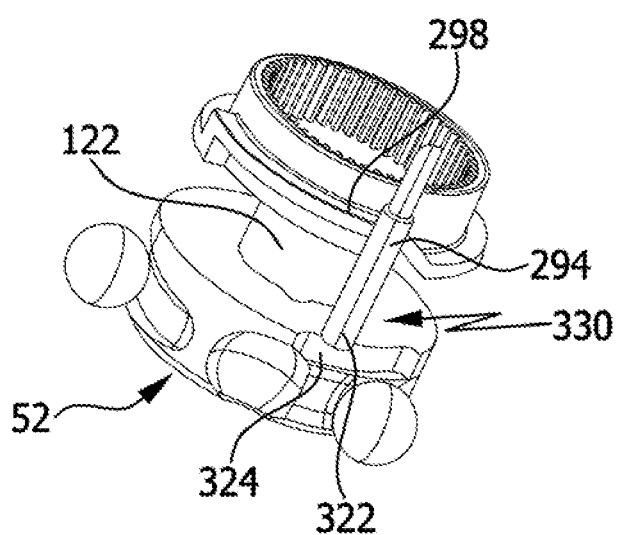
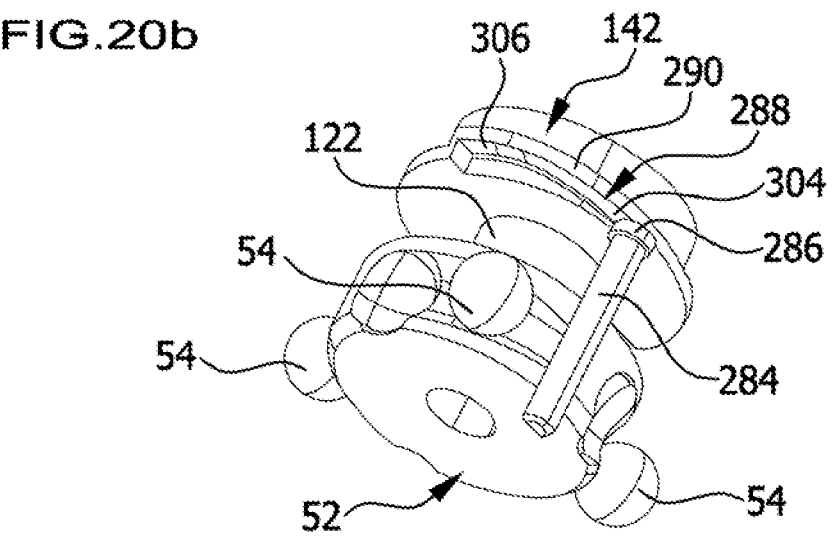

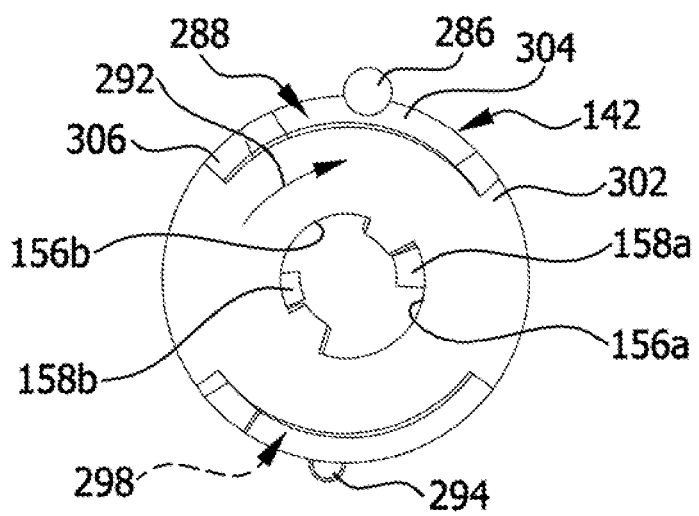
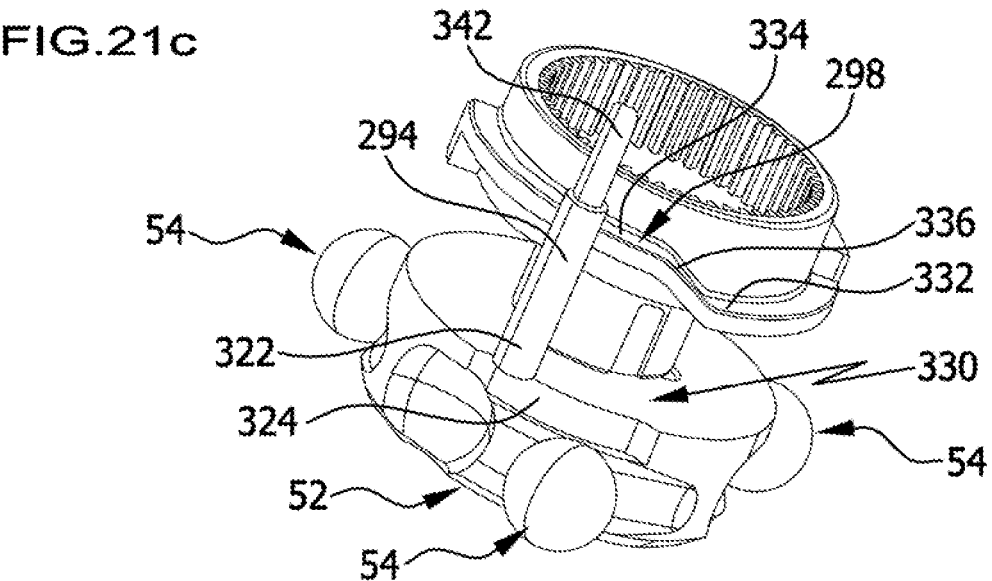
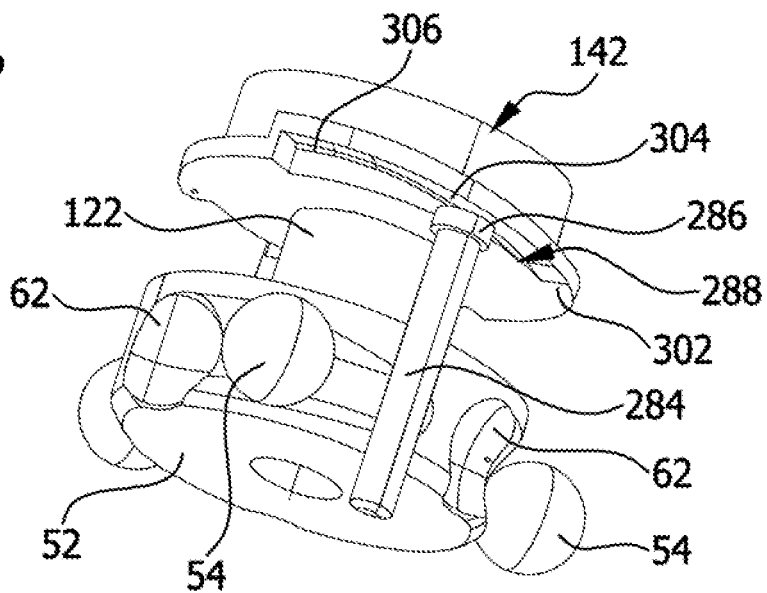

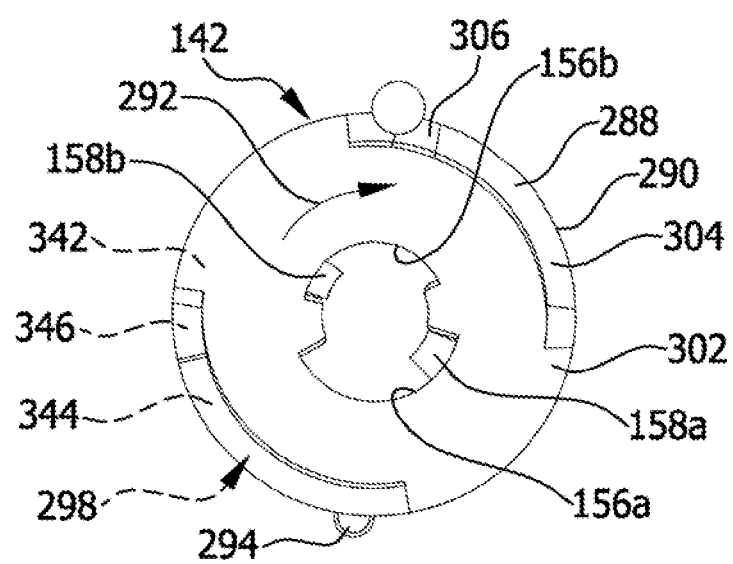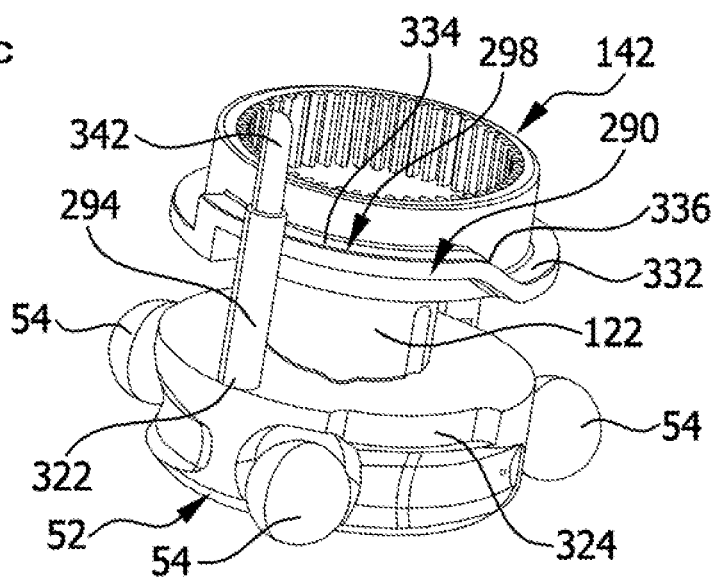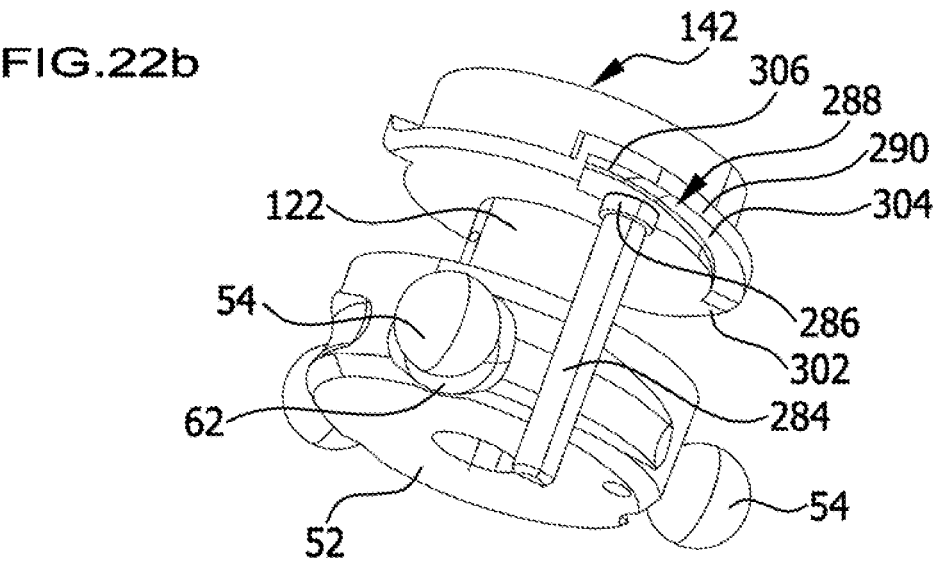

FIG.23
FIG.23a
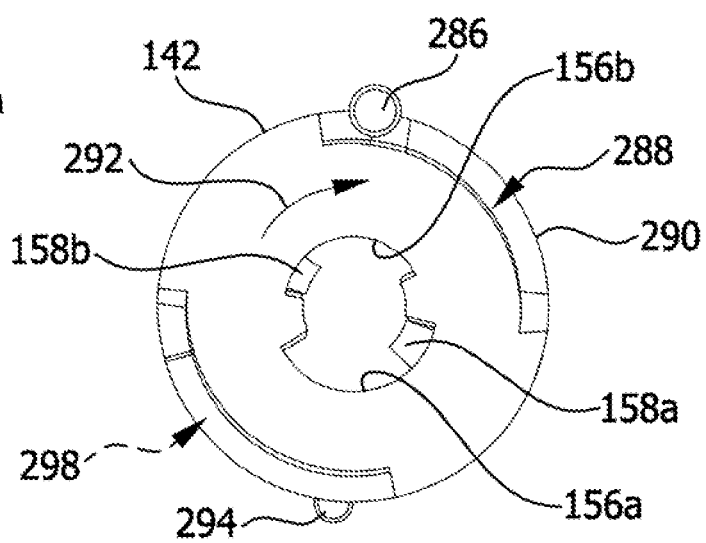
FIG.23c
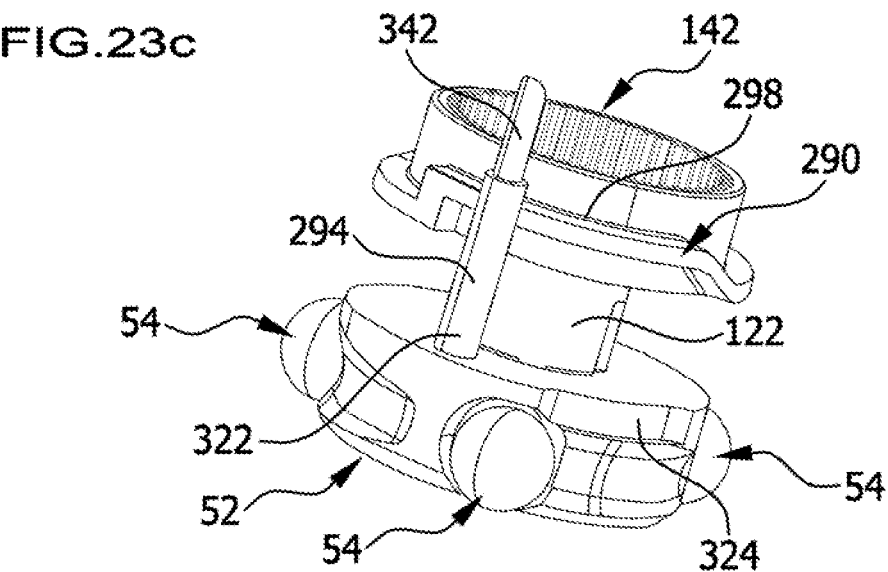
FIG.23b
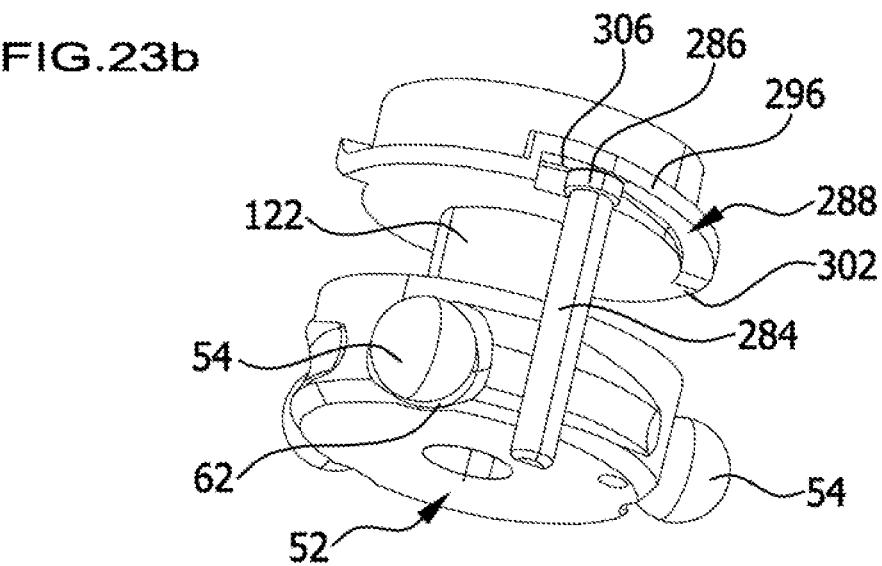

FIG. 24
FIG. 24a
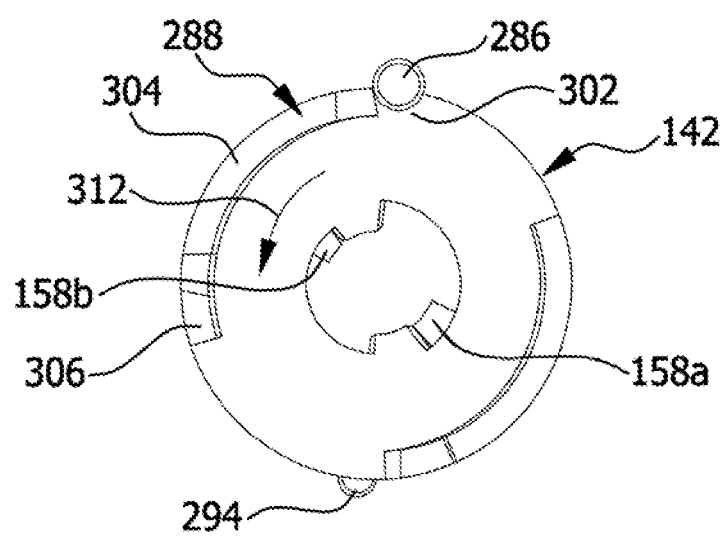
FIG. 24c
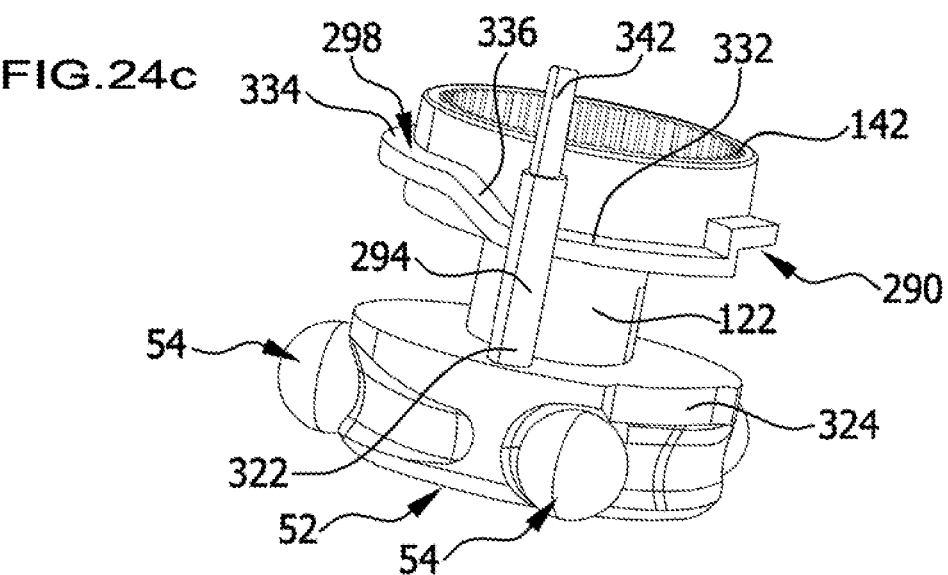
FIG. 24b
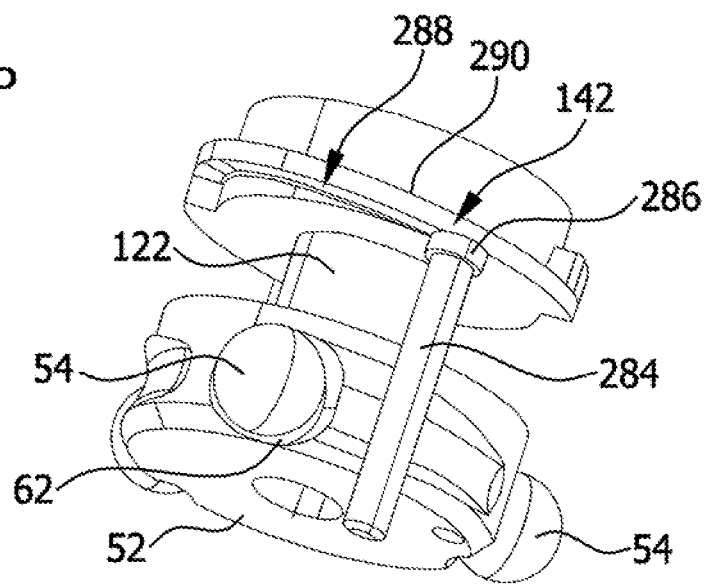

FIG. 25
FIG. 25a
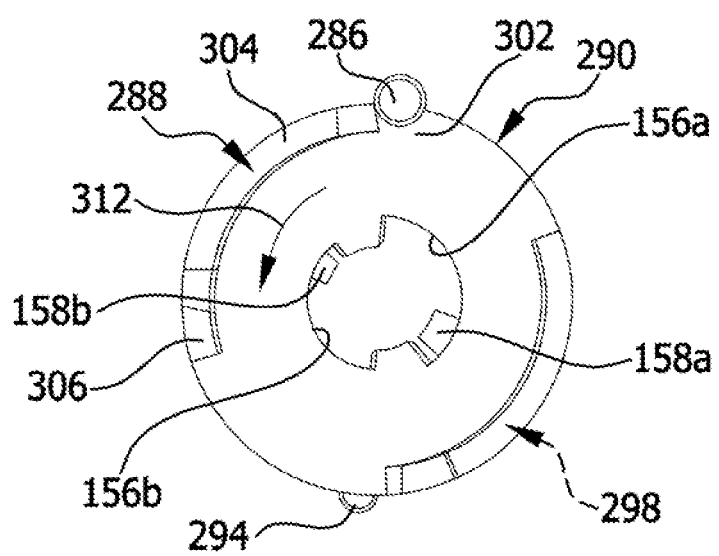
FIG. 25c
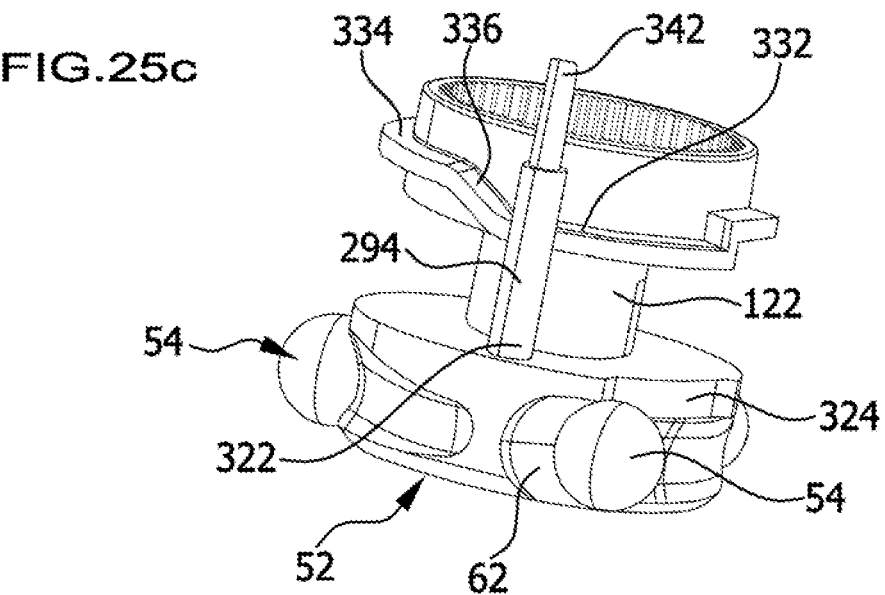
FIG. 25b
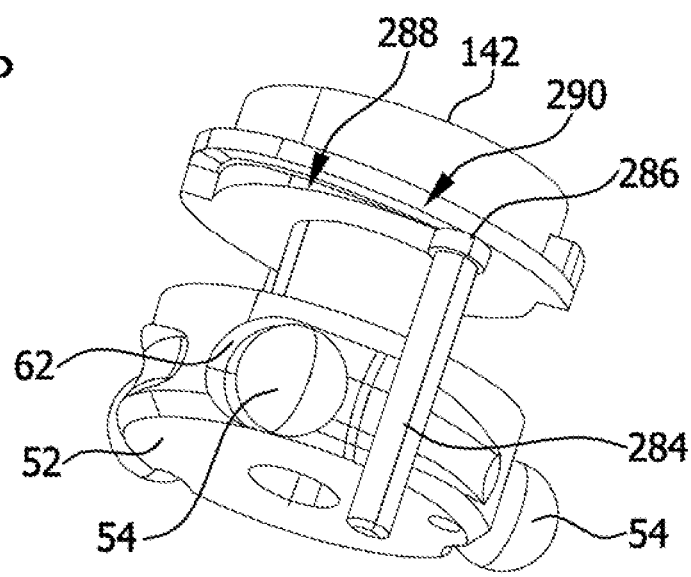

TRAILER HITCH

CROSS-REFERENCE TO RELATED PATENT APPLICATION

This patent application claims the benefit of German application No. 10 2019 129 346.4, filed Oct. 30, 2019, the teachings and disclosure of which are hereby incorporated in their entirety by reference thereto.

BACKGROUND OF THE INVENTION

The invention relates to a trailer hitch, comprising a ball neck, which is movable between an operative position and a rest position and has a pivot bearing body arranged at a first end and a trailer ball arranged at a second end, a pivot hearing unit, which is arranged fixed to the vehicle and by means of which the pivot hearing body is received such that it is pivotal about a pivot axis between the operative position and the rest position, and a rotation-blocking device having at least two rotation-blocking bodies that are guided such that they are movable in a guide direction by means of a guide body, wherein, in the operative position, the rotation-blocking bodies are configured to be brought into a rotation-blocking position by moving in the guide direction and, in this position, engage with a respective receptacle in the pivot bearing body in order to block a pivotal movement of the pivot bearing body about the pivot axis in relation to the wide body, and are configured to be brought into a release position and, in this position, are disengaged from the respective receptacle, and wherein the rotation-blocking device has an actuation body, which has a respective pressure surface extending transversely to the guide direction for each of the rotation-blocking bodies and of which the movement in an actuation direction causes the at least two rotation-blocking bodies to be movable and urgeable in the guide direction.

Trailer hitches of this kind are known for example from EP 1 741 572 A1.

However, such trailer hitches pose the basic problem of constructing them as compactly and structurally simply as possible m order that they can be used even in constrained spatial conditions.

SUMMARY OF THE INVENTION

According to the invention, this object is achieved with a trailer hitch of the type mentioned in the introduction in that a rest position latching device that is independent of the rotation-blocking device is provided, which, in an inactive position, permits movement of the pivot bearing body relative to the pivot bearing unit and, in a latching position, fixes the pivot bearing body such that it cannot rotate in relation to the pivot bearing unit, and in that a deactivation unit is provided by means of which the rest position latching device is deactivated independently of the pivotal movement of the pivot bearing body.

The advantage of the solution according to the invention can be seen in the fact that it allows the ball neck to be fixed in the rest position independently of the rotation-blocking position of the rotation-blocking device, and thus the rotation-blocking position can be configured primarily for the loads in the operative position, while the loads in the rest position of the ball neck are much smaller and so the rest position latching device can be made correspondingly simpler, and fact that the rest position latching device is performed in a simple manner, independently of the pivotal movement of the pivot bearing body, in particular independently of a drive of the pivotal movement of the pivot bearing body.

In principle, it would be conceivable to construct the rest position latching device such that it detects the rotary movement of the pivot bearing body and then, when the rest position is reached, activates a latching procedure.

However, in order to make the latching as functionally safe as possible, it is preferably provided for the rest position latching device to move of itself into the latching position when the pivot bearing body is in the rotary position corresponding to the rest position, as a result of aa spring, element provided therein, with the result that there is no need for actuation of a latching element required by a control, but rather there is a mechanically automatic function of the rest position latching device that ensures a high level of reliability.

The rest position latching device operates particularly safely and reliably in particular when, if it is not in the latching position, it is always in a latching-ready position—that is to say it is always able to move into the latching position—and thus moves reliably into the latching position when the rest position is reached, without further action thereon.

So that the rest position latching device can be suitably moved front the rest position latching position into the inactive position, it is preferably provided for the rest position latching device to be configured to be deactivated by means of a deactivation unit, in dependence on a certain functional condition of the trailer hitch.

This means that in a certain functional condition—that is to say for example for the purpose of preparing pivoting of the pivot bearing unit from the rest position into the operative position of the trailer hitch—by means of the deactivation unit the rest position latching device can be moved front the latching position into the inactive position.

Here, a particularly favorable solution provides for the rest position latching device to be configured to be deactivated by means of the deactivation unit before the pivot bearing body is pivoted from the rest position into the operative position, with the result that after deactivation, in particular directly after deactivation, of the rest position latching device, pivoting of the pivot bearing body from the rest position into the operative position can be initiated and performed.

Here, the deactivation unit could be actuated in the most diverse ways.

A favorable solution provides for the rest position latching device to be configured to be deactivated by means of the deactivation unit by a drive unit that cooperates with the deactivation unit, with the result that in particular deactivation of the rest position latching device can be performed by a control that controls the drive unit.

In particular, in the case of the rest position latching device according to the invention having a deactivation unit of this kind, it is possible to provide a distribution gear that is drivable by means of a drive element and which has a first take-off element, by means of which the pivotal movement of the pivot bearing body with the ball neck is driven, and a second take-off element, which cooperates with the deactivation unit for the purpose of deactivating the rest position latching device.

This means that the drive for the deactivation unit can be derived from a distribution gear that on the one hand drives the pivotal movement of the pivot bearing body, and on the other serves to drive the deactivation unit.

Here, the distribution gear can be constructed in diverse ways.

For example, an advantageous solution provides for the distribution gear to couple the drive element to the first take-off element or the second take-off element automatically.

Further, the distribution gear can be constructed in the most diverse ways.

A simple and advantageous solution provides for the distribution gear to be an epicyclic gear, in particular a planetary gear.

Further, it is favorably provided for the drive element of the distribution gear to be driven by means of the in particular electrically operated drive unit.

More detailed statements have not yet been made as regards the construction of the rest position latching device.

For example, a particularly simple solution provides for the rest position latching device to comprise a latching body that is arranged in the pivot bearing body or the pivot bearing unit, is movable in a latching direction, and is configured to be brought into engagement with a latching receptacle arranged in the pivot bearing unit or the pivot bearing body.

In particular, this solution does not need any additional overall space and thus allows a particularly simple construction of the rest position latching device.

In the simplest case here, the latching body that is movable in the latching direction is arranged in the pivot bearing body, and the latching receptacle is arranged in the pivot bearing unit.

However, it is also possible to arrange the latching body in the pivot bearing unit and to arrange the latching receptacle in the pivot bearing body.

Further, it is advantageous for reliable functioning of the latching device if the latching direction extends parallel to the pivot axis, since this facilitates movement of the latching body into the latching receptacle.

So that the rest position latching device can be deactivated simply, it is preferably provided for there to be associated with the latching receptacle an actuation body of the deactivation unit that, when the deactivation unit is active, expels the latching body from the latching receptacle and thus releases the rest position latching device from the latching position.

In this way, the latching body can be moved from the rest position latching position into the inactive position mechanically and in a particularly structurally simple manner.

In connection with the explanation above of the solution according to the invention, more detailed statements have not been made as regards the construction of the rotation-blocking device.

For example, an advantageous solution provides for the rotation-blocking bodies to be arranged around the actuation body.

Preferably here, for example not only two but three rotation-blocking bodies are provided.

In principle here, the rotation-blocking bodies may be arranged in any desired manner in relation to the actuation body.

An exemplary embodiment here provides for the rotation-blocking bodies to be arranged around the actuation body, in a solution of this kind, on the one hand it is possible for the rotation-blocking bodies to be arranged in a manner that saves on space, and on the other an at least partial compensation of the reaction forces acting on the actuation bodies is possible.

An arrangement of this kind is particularly favorable if the rotation-blocking bodies are arranged to be substantially symmetrical in relation to a plane running perpendicular to the pivot axis.

It is particularly favorable for urging of the rotation-blocking bodies if the actuation body has wedge faces extending transversely to the guide direction.

Preferably, it is provided for the actuation body to be arranged such that it is rotatable about the pivot axis, and to have wedge faces that extend in particular over an angular range about the pivot axis and vary in a line parallel with the guide direction.

This allows the rotation-blocking bodies to move into the rotation-blocking position in a simple manner.

In particular, the functionality of the rotation-blocking bodies is optimal if at least one component of the guide direction extends in the radial direction in relation to the pivot axis.

It is particularly favorable if the guide direction extends approximately in the radial direction in relation to the pivot axis.

In that case, an approximate course in the radial direction in relation to the pivot axis may differ by up to 30° from the radial direction.

Moreover, in connection With the description above of the solution according to the invention, no statements have been made as to how the rotation-blocking bodies are for their part to be guided in the guide direction.

For example, it would be conceivable to guide the rotation-blocking bodies through a guide receptacle in the pivot bearing body and to provide stationary receptacles with which the at least one rotation-blocking body is configured to be brought into or out of engagement.

Further, it is preferably provided for the rotation-blocking body to be guided by the guide body, which radially adjoins the pivot bearing body, such that this also makes a compact construction of the rotation-blocking device possible.

In particular here, the guide body takes a form such that it has a guide sleeve with the guide receptacle for the respective rotation-blocking body.

More detailed statements have not yet been made as regards guiding the actuation body in the pivot bearing unit, either.

For example, a particularly favorable solution provides for the guide body to guide the actuation body movably, in particular rotatably.

Further, it is favorable for a compact and mechanically simple construction of the pivot bearing unit if the guide body carries a pivot bearing for the pivot bearing body, or itself forms a pivot bearing.

Further, it is favorably provided for the guide body to be part of the pivot bearing unit that is arranged fixed to the vehicle.

In the context of the solution according to the invention, different possibilities are conceivable for the relative arrangement of the guide body, the pivot bearing body and the actuation body.

For example, a solution would be conceivable in which the actuation body surrounds the guide body, and the pivot bearing body is surrounded by the guide body—that is to say it engages in the guide body.

A particularly compact solution provides for the actuation body to be surrounded by the guide body and for in particular the pivot bearing body to embrace the guide body such that this forms a compact unit that can be constructed to be particularly saving on space.

Favorably, it is provided for the pivot bearing body to form an outer body that outwardly surrounds the pivot bearing unit and is arranged to be non-displaceable in the direction of the pivot axis in relation to the pivot bearing unit, and for in particular the first end of the ball neck to be attached to the outer body.

An arrangement of this kind for the pivot bearing body has the advantage on the one hand of a favorable spatial construction of the pivot bearing unit, and on the other of relatively simple sealing of the pivot bearing unit, since the pivot bearing body does not perform any movements in the axial direction of the pivot axis.

Preferably, there is provided between a housing of the pivot bearing, unit and an end face of the outer body a seal that surrounds the pivot axis and by means of which there is sealing to prevent the ingress of dirt and moisture.

With a solution of this kind, the pivot bearing body at the same time represents the outer body that protects and surrounds the pivot bearing unit, and because the outer body is arranged to be non-displaceable in the direction of the pivot axis in relation to the pivot bearing unit, in particular the effect is that simple sealing between the outer body and the pivot bearing unit is realizable.

A solution in which the pivot bearing body forms an outer body that outwardly surrounds a sub-region of the rotation-blocking device and is arranged to be non-displaceable in the direction of the pivot axis in relation to the guide body is particularly favorable from a structural point of view.

In particular, it is provided for the rotation-blocking bodies to be movable by the actuation body from a release position into a rotation-blocking position.

Preferably here, the actuation body takes a form such that in the release position it permits the release position of the rotation-blocking bodies.

In particular, a further embodiment of the actuation-blocking body provides for it, in the rotation-blocking position, to keep the rotation-blocking bodies in their rotation-blocking position.

In order to ensure that the rotation-blocking bodies always move into their rotation-blocking position, in particular when there is no active actuation of the actuation body, it is preferably provided for the actuation body to be urged in the direction of its rotation-blocking position by an elastic energy storage system.

So that the actuation body can then be moved from the rotation-blocking position into the release position, it is preferably provided for the actuation body to be movable from the rotation-blocking position into the release position by an actuation device.

In particular, movement of the actuation body of this kind by the actuation device is in opposition to urging by the energy storage system—that is to say that the actuation device acts in opposition to urging by the energy storage system and so must overcome the forces applied by the energy storage system.

In particular in the case of a rotary, actuation body, it is preferably provided for the actuation device to be used to turn the actuation body in opposition to the direction of rotation brought about by the energy storage system.

An elastic energy storage system of this kind may in principle be arranged at a plurality of locations.

From a structural point of view, it is particularly favorable if the elastic energy storage system is ranged within the pivot bearing unit.

A further structurally favorable solution provides for the elastic energy storage system to be arranged on one side of the actuation body.

In this case, the elastic energy storage system can advantageously be coupled to the actuation element.

As regards action on the actuation body, the most diverse solutions are conceivable.

For example, an advantageous solution provides for the actuation device to have a take-off element that is coupled to the actuation body.

It would be possible in principle to couple the take-off element and the actuation body to one another rigidly.

However, it is particularly favorable if the take-of element and the actuation body are coupled to one another by way of an entraining coupling device that, depending on the position of the take-off element and the position of the actuation body, in particular their rotary position, allows relative movement about a limited angle of rotation.

Here, the entraining coupling device could be an elastic connecting member.

However, it is particularly simple if the entraining coupling device has an entrainment-free release condition and an entrained condition—that is to say that either the release condition or the entrained condition prevails.

In connection with the solutions above, the drive of the rotation-blocking device, which makes it possible to implement movement of the rotation-blocking device from at least one rotation-blocking position into a release position and vice versa, has only been explained in general terms.

Further, it is preferably provided for the actuation device to comprise a motorized drive unit for the rotation-blocking device.

Here, a motorized drive unit that is associated exclusively with the actuation device for the rotation-blocking device could be provided.

However, it is particularly favorable if a motorized drive unit is provided as a pivotal strive for performing the pivotal movement of the pivot bearing body.

For example, it is conceivable to provide two motorized drive units, wherein one motorized drive unit is provided fix actuation of the rotation-blocking device and one motorized drive unit is provided for performing the pivotal movement of the pivot bearing body.

In particular, since driving of the rotation-blocking device always takes place at times during which there is not to be any pivotal movement of the pivot bearing body, and on the other hand a pivotal movement of the pivot bearing body always takes place when no driving of the rotation-blocking device is required, it is conceivable to provide a switchover device that alternately switches a supplied drive energy such as a current source from one drive to the other such that the drive power made available by a separate supply device (for example on the motor vehicle) can be utilized either for actuation of the rotation-blocking device or for pivoting the pivot bearing body.

In this case, however, it is necessary, using a corresponding sensor system, to detect when the rotation-blocking device is in the rotation-blocking position or the free-running position and when the pivot bearing body is in the position corresponding to the operative position or the position corresponding to the rest position, and, depending on the positions detected by the sensor system, to switch the drive power over from one drive to the other.

If the rotation-blocking device is driven independently of the drive for the pivotal movement of the pivot bearing body, the problem arises that, in the event of a fault, it becomes difficult to identify unambiguous starting positions both for the pivotal movement of the pivot bearing body and for the rotation-blocking device.

It is particularly favorable if a take-off element for driving the rotation-blocking device and a take-off element for driving the pivotal movement of the pivot bearing body are coupled by an epicyclic gear that is driven by means of a drive element.

In this case, it is possible to drive the epicyclic gear using a single motorized drive unit, in particular a single electrical drive unit.

It is particularly favorable if the first take-off element of the epicyclic gear acts as a pivotal drive on the pivot bearing body for the purpose of pivoting the ball neck between the operative position and the rest position, and the second take-off element of the epicyclic gear acts as an actuating drive on the actuation body in order to move it from the rotation-blocking position into the release position.

Here, the epicyclic gear favorably takes a form such that it enables alternation between the take-off element for actuating the rotation-blocking device and the take-off element for performing the pivotal movement of the pivot bearing body.

In particular, the epicyclic gear can be used such that, depending on restraint of the take-off element for the rotation-blocking device, or the pivotal movement of the pivot bearing body, the pivotal movement or the rotation-blocking device is driven.

The advantage of using an epicyclic gear can be seen in the fact that a planetary gearing of this kind enables alternation from one take-off element to the other in a simple manner and thus one drive unit, comprising for example an electrical drive motor and if necessary a gear, is sufficient to alternately drive the movements of the actuation body by way of the one take-off and to drive the pivotal movement of the ball neck between the operative position and the rest position by way of the other take-off.

For example, it is provided for a sun wheel of the epicyclic gear to be drivable by the motorized drive.

Further, it is favorably provided for a ring gear of the epicyclic gear to be coupled to the take-off for the rotation-blocking device.

Further, it is favorably provided for a planetary wheel carrier of the epicyclic gear to be coupled to the take-off for the pivotal movement.

In order, in the case of an epicyclic gear that is driven by a single motorized drive, either to drive the rotation-blocking device or to drive the pivotal movement, it is advantageously provided for the pivotal movement or the rotation-blocking device to be driven in dependence on restraint of the drive of the rotation-blocking device or the pivotal movement.

A restraint of this kind, of the pivotal movement or the rotation-blocking device, is implementable in diverse ways.

Restraint of the pivotal movement is implementable in a simple manner in that the pivot bearing part is lockable in relation to the pivot bearing unit, with the result that when the pivot bearing part is locked the pivotal movement is necessarily restrained.

Restraint of the drive of the rotation-blocking device may be performed in the most diverse ways.

For example, a particularly favorable solution provides far the release position latching device to be provided for the purpose of restraining driving of the rotation-blocking device.

The most diverse solutions are conceivable as regards the arrangement of the epicyclic gear.

A particularly compact solution provides for the epicyclic gear to be arranged coaxially in relation to the pivot axis in the pivot bearing unit.

Further, it is preferably provided for the epicyclic gear to be arranged on a side of the actuation element of the rotation-blocking device that faces the motorized drive.

For compact construction, it is particularly beneficial if as seen in the direction of the pivot axis, the epicyclic gear is driven on one side by the motorized drive unit and on the opposite side has a drive for the actuation element.

In this way, preferably the epicyclic gear is arranged, as seen in the direction of the pivot axis, between the motorized drive unit and the actuation element.

Further, preferably the epicyclic gear, the elastic energy storage system and the actuation element are arranged to succeed one another in the direction of the pivot axis, in particular within the pivot bearing unit.

In order further to ensure that the actuation body does not, despite being urged by the elastic energy storage system, depart from its rotation-blocking position, it is preferably provided for the actuation body to be blockable in its rotary position by a securing device.

In particular here, it is provided for the actuation body to be blockable, by the securing device, to prevent its reaching its release position in order to ensure that the actuation body never of itself, for example if the elastic energy storage system urging it in the direction of its active position breaks, enables the release position of the rotation-blocking bodies.

A securing device of this kind takes a form such that it requires an action to override blocking of the actuation body.

For this reason, it is favorably provided for the actuation device for the rotation-blocking device to be coupled to the securing device such that the actuation, device may also be used to override release of the blocking of the actuation body by the securing device.

Preferably here, the securing device is coupled to the actuation device such that the securing device blocks movement of the actuation body that is not triggered by an actuation.

In particular, the securing device takes a form such that when the actuation device is not actuated the securing device blocks movement of the actuation body into its release position.

An advantageous solution here provides for the drive element of the actuation device, for example the take-off element of the planetary gear, to be coupled to the securing device.

Favorably, in this case the take-off element—for example the take-off element of the epicyclic gear—can take a form such that, by way of the take-off element, action on the actuation body and action on the securing device are matched to one another, such that actuation of the actuation device on the one hand has the result that blocking of the actuation body is overridden and on the other has the result that the actuation body is moved from the active position into the inactive position.

For example, it is provided for this purpose for the take-off element, in the course of moving from the starting position into an intermediate position, to move the securing device from the secured position into the unsecured position.

The most diverse possibilities are conceivable as regards the coupling between the take-off element and the securing device.

For example, any type of coupling, for example also coupling by way of an electrical control, would be conceivable.

Here, a solution that, because of its simplicity, is particularly favorable provides for the take-off element and the securing device to be coupled to one another by way of a mechanical coupling device.

Favorably, the mechanical coupling device takes a form such that it controls action on the securing device by means of a cam track.

The most diverse solutions are conceivable as regards the form taken by the securing device.

The securing device operates particularly favorably if it has an elastic energy storage system, which always is urged the securing device in the direction of its position that secures or blocks the actuation body in the rotation-blocking position.

Further, it is preferably provided for the securing device to be movable starting from its secured position into an unsecured position.

Preferably in this case, a movement of the securing device into the unsecured position is likewise performed by the take-off element for the actuations in particular likewise by the second take-off element of the distribution gear.

In the solution according to the invention, the rotation-blocking device is intended to be inactive for the purpose of reaching the rest position and when the rest position is reached, with the result that there is a need to keep the rotation-blocking device in the release position during these pivotal movements, in particular with the actuation body.

In principle, it would be conceivable here to provide a separate drive that moves the actuation body form the rotation-blocking position into the release position and keeps it there until the rotation-blocking position is to be adopted again.

So that, when the pivot bearing body is pivoted into the rest position, the release position of the rotation-blocking device can be maintained using simple arrangements, there is provided a release position latching device that, in a release position of the actuation body, is movable between a latch release position, which releases movement of the actuation body in relation to the guide body, and a latching position, which fixes the actuation body in relation to the guide body, and, at least in the release position of the actuation body, is urged in the direction of the latching position by a spring element.

With a release position latching device of this kind, it is possible in a simple manner to keep the actuation body in the release position during movement of the ball neck and hence the rotary movement of the pivot hearing body from the operative position into the rest position.

In the solution according to the invention, it is possible in particular to rotate the pivot bearing body without the rotation-blocking bodies affecting it in any way, and moreover it is possible to use the rotation-blocking device for example only for fixing the pivot hearing body in the rotary position that corresponds to the operative position of the ball neck.

Further, it is preferably provided for the rotation-blocking body to be always urged by a force—for example the force of a spring—such that it tends to move into the rotation-blocking position, with, the result that this force action on the actuation body can be present even when it is in the release position, since in the release position the latching device prevents rotary movement of the actuation body because of urging by the spring.

In particular in the solution according to the invention, it is provided, in the release position of the actuation body, for the release position latching device to move of itself into the latching position once the pivot hearing body has departed from the rotary position corresponding to the operative position.

In particular in the solution according to the invention, it is provided, when at least one functional position of the trailer hitch is reached, for the release position latching device to move from the latching position into the latch release position and thus in turn to release movement of the actuation body, in particular in the direction of its rotation-blocking position.

In particular here, the functional position does not correspond to the rest position of the trailer hitch, but is a position comprising the operative position.

In the simplest case, the functional position is that of the operative position of the trailer hitch, with the result that it is ensured that in the operative position the release position latching device always moves from the latching position into the latch release position, and thus in the operative position the rotation-blocking device is active.

Here, movement from the latching position into the latch release position could be performed as a result of detecting the most diverse variables that affect functioning of the trailer hitch.

For example, the position of the ball neck, in particular the operative position of the ball neck, could be detected electronically and then movement of the release position latching device from the latching position into the latch release position could be initiated electronically.

The individual functional positions of the trailer hitch can be detected particularly simply in that a rotary position of the pivot bearing body is detected, with the result that the release position latching device moves from the latching position into the latch release position, depending on at least one particular rotary position of the pivot bearing body.

Here, it is particularly advantageous if the release position latching device moves from the latching position into the latch release position when at least one predetermined rotary position of the pivot bearing body is reached—that is to say that this makes it possible in a simple manner to establish the rotary position of the pivot bearing body at which the release position latching device is to move from the latching position into the latch release position.

As regards functional safety, it has proved particularly favorable if the release position latching device moves from the latching position into the latch release position under mechanical control when the at least one predetermined rotary position of the pivot bearing body is reached.

Mechanical control of the movement from the latching position into the latch release, position ensures a particularly high level of functional safety, since an important aspect of safety is that, in the operative position, the rotation-blocking device always moves of itself into the rotation-blocking position and remains there.

More detailed statements have not yet been made as regards the detailed form taken by the release position latching device.

For example, an advantageous embodiment provides for the release position latching device to comprise a latching body, which is guided in a latching direction in the actuation body or the pivot bearing unit, and a latching receptacle, which is provided in the pivot bearing unit or the actuation body and in which the latching body engages in the latching position and from which it disengages in the latch release position.

A mechanical solution of this kind is on the one hand simple to construct and on the other extremely saving on space.

It is particularly favorable if the latching body is arranged in the actuation body such that it is guided in the latching direction, and the latching receptacle is arranged in the guide body.

So that, with a mechanical construction of this kind, the rotary positions of the pivot bearing body can be detected, it is preferably provided for there to be arranged in the latching receptacle a sensor body, which detects that rotary positions of the pivot bearing body in relation to the guide bed are adopted and can thus recognize mechanically the rotary positions of the pivot bearing body in relation to the guide body.

In particular, this can advantageously be implemented in that the sensor body uses a sensor head to scan a contour on the pivot bearing body that is entrainable with the pivot bearing body, for the purpose of detecting the individual rotary positions of the pivot bearing body.

So that, when the desired rotary positions are reached, it is then possible to move the latching body from the latching position into the latch release position in a simple manner, it is preferably provided, in at least one predetermined rotary position of the pivot bearing body, for the sensor body to expel the latching body from the latching receptacle and thus to move it from the latching position into the latch release position.

More detailed statements have not yet been made as regards the latching direction of the latching body.

For example, the latching body and the latching receptacle could be oriented such that the latching direction extends radially in relation to the pivot axis.

However, a solution that is particularly favorable from a structural point of view provides for the latching body to be movable in a latching direction that extends parallel to the pivot axis.

Thus, the description above of solutions according to the invention comprises in particular the different combinations of features that are defined by embodiments in the following paragraphs below.

An embodiment of the present id trailer hitch, comprising a ball neck (10), which is movable between an operative position (A) and a rest position (R) and has a pivot bearing body (14) arranged at a first end (12) and a trailer ball (18) arranged at a second end (16), a pivot bearing unit (20), which is arranged fixed to the vehicle and by means of which the pivot bearing body (14) is received such that it is pivotal about a pivot axis (22) between the operative position (A) and the rest position (R), and a rotation-blocking device (50) having at least two rotation-blocking bodies (54) that are guided such that they are movable in a guide direction (58) by means of a guide body (40), wherein, in the operative position (A), the rotation-blocking bodies (54) are configured to be brought into a rotation-blocking position by moving in the guide direction (58) and, in this position, engage with a respective receptacle (60) in the pivot bearing body (14) in order to block a pivotal movement of the pivot bearing body (14) about the pivot axis (22) in relation to the guide body (40), and are configured to be brought into a release position and, in this position, are disengaged from the respective receptacle (60), wherein the rotation-blocking device has an actuation body (52), which has a respective pressure surface (66) extending transversely to the guide direction (58) for each of the rotation-blocking bodies (54) and of which the movement in an actuation direction (72) causes the at least two rotation-blocking bodies (54) to be movable and urgeable in the guide direction (58), wherein a rest position latching device (270) that is independent of the rotation-blocking device (50) is provided, which, in an inactive position, permits movement of the pivot bearing body (14) relative to the pivot bearing unit (20) and, in a latching position, fixes the pivot bearing body (14) such that it cannot rotate in relation to the pivot bearing unit (20), and wherein a deactivation unit (280) is provided by means of which the rest position latching device (270) is deactivated independently of the pivotal movement of the pivot bearing body (14).

The above embodiment can have a feature wherein the rest position latching device (270) moves of itself into the latching position when the pivot bearing body (14) reaches the rotary position corresponding to the rest position (R), as a result of a spring element (276) provided therein.

Above preceeding embodiments can have a feature wherein, when the rest position latching device (270) is not in the latching position, it is always in a latching-ready position.

Above embodiments can have a feature wherein the rest position latching device (270) is configured to be deactivated by means of the deactivation unit (280), in dependence on a certain functional condition of the trailer hitch.

The above embodiment in the preceding paragraph can have a feature wherein the rest position latching device (270) is configured to be deactivated by means of the deactivation unit (280) before the pivot bearing body (14) is pivoted from the rest position (R) into the operative position (A).

Above preceding embodiments can have a feature wherein the rest position latching device (270) is configured to be deactivated by means of the deactivation unit (280) by a drive unit (182) that cooperates with the deactivation unit (280).

Above preceeding embodiments can have a feature wherein there is provided a distribution gear (130) that is drivable by means of a drive element (162) and which has a first take-off element (152), by means of which the pivotal movement of the pivot bearing body (14) with the ball neck (10) is driven, and a second take-off element (142), which cooperates with the deactivation unit (280) for the purpose of deactivating the rest position latching device (270).

The above embodiment in the preceding paragraph can have a feature wherein the distribution gear (130) couples the drive element (162) to the first take-off element (152) or the second take-off element (142) automatically.

The above embodiments in any of the two preceding paragraphs can have a feature, wherein the distribution gear is an epicyclic gear (130), in particular a planetary gear.

The above embodiments in any of the three preceding paragraphs can have a feature wherein the drive element (162) of the distribution gear (130) is driven by means of the in particular electrically operated drive unit (182).

Above preceding embodiments can have a feature wherein the rest position latching device (270) comprises a latching body (274) that is arranged in the pivot bearing body (14) or the pivot bearing unit (20), is movable in a latching direction, and is configured to be brought into engagement with a latching receptacle (282) arranged in the pivot bearing unit (20) or the pivot bearing body (14).

The above embodiment in the preceding paragraph can have a feature wherein the latching body (274) that is movable in the latching direction is arranged in the pivot bearing body (14), and in that the latching receptacle (282) is arranged in the pivot bearing unit (20).

The above embodiments in any of the two preceding paragraphs can have a feature wherein the latching direction extends parallel to the pivot axis (22).

The above embodiments in any of the three preceding paragraphs can have a feature wherein there is associated with the latching receptacle (282) an actuation body (284) of the deactivation unit (280) that, when the deactivation unit (280) is active, expels the latching body (274) from the latching receptacle (282).

Above preceding embodiments can have a feature wherein the rotation-blocking bodies (54) are arranged around the actuation body (52).

Above preceding embodiments can have a feature wherein the actuation body (52) is arranged such that it is rotatable about the pivot axis (22), and in particular has wedge faces (66) that extend over an angular range about the pivot axis (22) and vary in a line parallel with the guide direction (58).

Above preceding embodiments can have a feature wherein at least one component of the guide direction (58) extends in the radial direction in relation to the pivot axis (22).

Above preceding embodiments can have a feature wherein the rotation-blocking body (54) is guided by the guide body (40), which radially adjoins the pivot bearing body (14).

Above preceding embodiments can have a feature wherein the guide body (40) has a guide sleeve (44) with the guide receptacle (56) for the respective rotation-blocking body (54).

Above preceding embodiments can have a feature wherein the guide body (40) guides the actuation body (52) movably.

Above preceding embodiments can have a feature wherein the guide body (40) forms a pivot bearing for the pivot bearing body (14).

Above preceding embodiments can have a feature wherein the guide body (40) is part of the pivot bearing unit (20) that is arranged fixed to the vehicle.

Above preceding embodiments can have a feature wherein the actuation body (52) is surrounded by the guide body (40), and in that in particular the pivot bearing body (14) embraces the guide body (40).

Above preceding embodiments can have a feature wherein the pivot bearing body (14) forms an outer body that outwardly surrounds the pivot bearing unit (20) and is arranged to be non-displaceable in the direction of the pivot axis (22) in relation to the pivot bearing unit (20), and in that in particular the first end of the ball neck (10) is attached to the outer body (14).

Above preceding embodiments can have a feature wherein the pivot bearing body (14) forms an outer body that outwardly surrounds a sub-region of the rotation-blocking unit (50) and that is arranged to be non-displaceable in the direction of the pivot axis (22) in relation to the guide body (40).

Above preceding embodiments can have a feature wherein the actuation body (52) is urged in the direction of its rotation-blocking position by an elastic energy storage system (114).

Above preceding embodiments can have a feature wherein the actuation body (52) is movable from the rotation-blocking position into the release position by an actuation device (180).

The above embodiments in any of the two preceding paragraphs can have a feature wherein the actuation body (52) is movable by the actuation device (180) in opposition to urging by the energy storage system (114).

The above embodiments in any of the three preceding paragraphs can have a feature wherein the actuation body (52) is configured to be turned by the actuation device (180) in opposition to the direction of rotation brought about by the energy storage system (114).

Above preceding embodiments can have a feature wherein the actuation device (180) has a take-off element (142) that is coupled to the actuation body (52).

The above embodiment in the preceding paragraph can have a feature wherein the take-off element (142) and the actuation body (52) are coupled to one another by way of an entraining coupling device (156, 158).

The above embodiment in the preceding paragraph can have a feature wherein the entraining coupling device (156, 158) has an entrainment-free release condition and an entrained condition.

Above preceding embodiments can have a feature wherein the actuation device (180) comprises a motorized drive unit for the rotation-blocking device (50).

Above preceding embodiments can have a feature wherein the motorized drive unit (182) is also provided as a pivotal drive for performing the pivotal movement of the pivot bearing body (14).

Above preceding embodiments can have a feature wherein a take-off element (142) for driving the rotation-blocking device (50) and the take-off element (152) for driving the pivotal movement of the pivot bearing body (14) are coupled by an epicyclic gear (130).

The above embodiment in the preceding paragraph can have a feature wherein the epicyclic gear (130) is drivable by a single motorized drive unit (182).

Above preceding embodiments can have a feature wherein the first take-off element (152) of the epicyclic gear (130) acts as a pivotal drive on the pivot bearing body (14) for the purpose of pivoting the ball neck (10) between the operative position (A) and the rest position (R), and in that the second take-off element (142) of the epicyclic gear (130) acts as an actuating drive on the actuation body (52) in order to move it from the rotation-blocking position into the release position.

The above embodiment in the preceding paragraph can have a feature wherein the epicyclic gear (130) enables alternation between the take-off element (142) for actuating the rotation-blocking device (50) and the take-off element (152) for performing the pivotal movement of the pivot bearing body (14).

Above preceding embodiments can have a feature wherein the pivotal movement or the rotation-blocking device (50) is driven in dependence on restraint of the take-off element (142, 152) for the rotation-blocking device (50) or the pivotal movement of the pivot bearing body (14).

The above embodiments in any of the five preceding paragraphs can have a feature wherein the epicyclic gear (130) is arranged coaxially in relation to the pivot axis (22).

The above embodiments in any of the six preceding paragraphs can have a feature wherein the epicyclic gear (130) is arranged on a side of the actuation element (52) that faces the motorized drive (182).

The above embodiments in any of the seven preceding paragraphs can have a feature wherein, as seen in the direction of the pivot axis (22), the epicyclic gear (130) is driven on one side by the motorized drive unit (182) and on the opposite side has a take-off (142) for the actuation element (52).

The above embodiments in any of the eight preceding paragraphs can have a feature wherein the epicyclic gear (130) is arranged, as seen in the direction of the pivot axis (22), between the motorized drive unit (182) and the actuation element (52).

The above embodiments in any of the nine preceding paragraphs can have a feature wherein the epicyclic gear (130), the elastic energy storage system (114) and the actuation element (52) are arranged to succeed one another in the direction of the pivot axis (22).

Above preceding embodiments can have a feature wherein the actuation body (52) is blockable in its rotation-blocking position by a securing device (330).

The above embodiment in the preceding paragraph can have a feature wherein the actuation body (52) is blockable, by the securing device (330), to prevent its reaching its release position.

Above preceding embodiments can have a feature wherein there is provided a release position latching device (240) that, in a release position of the actuation body (52), is movable between a latch release position, which releases movement of the actuation body (52) in relation to the guide body (40), and a latching position, which fixes the actuation body (52) in relation to the guide body (40), and, at least in the release position of the actuation body (52), is urged in the direction of the latching position by a spring element.

The above embodiment in the preceding paragraph can have a feature wherein, in the release position of the actuation body (52), the release position latching device (240) moves automatically into the latching position once the pivot bearing body (14) has left the rotary position corresponding to the operative position (A).

The above embodiments in any of the two preceding paragraphs can have a feature wherein, when at least one functional position of the trailer hitch is reached, the release position latching device (240) moves from the latching position into the latch release position.

The above embodiments in any of the three preceding paragraphs can have a feature wherein the release position latching device (240) moves from the latching position into the latch release position, depending on at least one particular rotary position of the pivot bearing body (14).

The above embodiments in any of the two preceding paragraphs can have a feature wherein the release position latching device (240) moves from the latching position into the latch release position when at least one predetermined rotary position of the pivot bearing body (14) is reached.

The above embodiments in any of the two preceding paragraphs can have a feature wherein the release position latching device (240) moves from the latching position into the latch release position under mechanical control when the at least one predetermined rotary position of the pivot bearing body (14) is reached.

The above embodiments in any of the six preceding paragraphs can have a feature wherein the release position latching device (240) is provided for the purpose of restraining the take-off element (142) for the rotation-blocking device (50).

The above embodiments in any of the seven preceding paragraphs can have a feature wherein the release position latching device (240) comprises a latching body (244), which is guided in a latching direction in the actuation body (52) or the pivot bearing unit (20), and a latching receptacle (252), which is provided in the pivot bearing unit (20) or the actuation body (52) and in which the latching body (244) engages in the latching position and from which the latching body (244) disengages in the latch release position.

The above embodiment in the preceding paragraph can have a feature wherein the latching body (244) is arranged in the actuation body (52) such that it is guided in the latching direction, and the latching receptacle (252) is arranged in the guide body (40).

The above embodiments in any of the two preceding paragraphs can have a feature wherein there is associated with the latching receptacle (252) a sensor body (254), which detects that rotary positions of the pivot bearing body (14) in relation to the guide body (40) are adopted.

The above embodiment in the preceding paragraph can have a feature wherein the sensor body (254) uses a sensor head (256) to scan a scannable actuation camming guide (262) that is arranged on the pivot bearing body (14) and is configured to be entrained with the pivot bearing body (14), for the purpose of detecting the individual rotary positions of the pivot bearing body (14).

The above embodiments in any of the two preceding paragraphs can have a feature wherein, in at least one predetermined rotary position of the pivot bearing body (14), the sensor body (254) expels the latching body (244) from the latching receptacle (252).

The above embodiments in any of the five preceding paragraphs can have a feature wherein the latching body (244) is movable in a latching direction that extends parallel to the pivot axis (22).

Further features and advantages of the solution according to the invention form the subject matter of the description below and the representation in the drawing of an exemplary embodiment.

BRIEF DESCRIPTION OF THE DRAWINGS

FIG. 19 shows the starting position:

FIG. 19a shows a plan view of the ring gear of the planetary gear, from the drive sleeve side;

FIG. 19b shows a perspective illustration of the interaction of the ring gear in the position of FIG. 19a with the deactivation unit for the rest position latching device and the rotation-blocking device;

FIG. 19c shows a perspective illustration of the interaction of the ring gear in the position of FIG. 19a with a securing device and the rotation-blocking device;

FIG. 20 shows the first position of the ring gear, which is turned in relation to the starting position, for releasing the securing device and without any action on the rotation-blocking device;

FIG. 20a shows a plan view of the ring gear of the planetary gear, from the drive sleeve side;

FIG. 20b shows a perspective illustration of the interaction of the ring gear in the position of FIG. 20a with the deactivation unit for the rest position latching device and the rotation-blocking device;

FIG. 20c shows a perspective illustration of the interaction of the ring gear in the position of FIG. 20a with a securing device and the rotation-blocking device;

FIG. 21 shows a position of the ring gear that is turned as far as possible in relation to the starting position without any action on the rotation-blocking device;

FIG. 21a shows a plan view of the ring gear of the planetary gear, from the drive sleeve side;

FIG. 21b shows a perspective illustration of the interaction of the ring gear in the position of FIG. 21a with the deactivation unit for the rest position latching device and the rotation-blocking device;

FIG. 21c shows a perspective illustration of the interaction of the ring gear in the position of FIG. 21a with a securing device and the rotation-blocking device;

FIG. 22 shows a position of the ring gear, which is turned in relation to the starting position, on reaching the release position of the rotation-blocking device;

FIG. 22a shows a plan view of the ring gear of the planetary gear, from the drive sleeve side;

FIG. 22b shows a perspective illustration of the interaction of the ring gear in the position of FIG. 22a with the deactivation unit for the rest position latching device and the rotation-blocking device;

FIG. 22c shows a perspective illustration of the interaction of the ring gear in the position of FIG. 22a with a securing device and the rotation-blocking device;

FIG. 23 shows a position of the ring gear, which is turned in relation to the starting position, on reaching the rest position of the pivot bearing body;

FIG. 23a shows a plan view of the ring gear of the planetary gear, from the drive sleeve side;

FIG. 23b shows a perspective illustration of the interaction of the ring gear in the position of FIG. 23a with the deactivation unit for the rest position latching device and the rotation-blocking device;

FIG. 23c shows a perspective illustration of the interaction of the ring gear in the position of FIG. 23a with a securing device and the rotation-blocking device;

FIG. 24 shows a position of the ring gear, which is turned in relation to the starting position, and deactivation of the rest position latching device;

FIG. 24a shows a plan view of the ring gear of the planetary gear, from the drive sleeve side;

FIG. 24b shows a perspective illustration of the interaction of the ring gear in the position of FIG. 24a with the deactivation unit for the rest position latching device and the rotation-blocking device;

FIG. 24c shows a perspective illustration of the interaction of the ring gear in the position of FIG. 24a with a securing device and the rotation-blocking device;

FIG. 25 shows a position of the ring gear, which is turned in relation to the starting position, as the rotation-blocking device moves into the rotation-blocking position;

FIG. 25a shows a plan view of the ring gear of the planetary gear, from the drive sleeve side;

FIG. 25b shows a perspective illustration of the interaction of the ring gear in the position of FIG. 25a with the deactivation unit for the rest position latching device and the rotation-blocking device; and FIG. 25c shows a perspective illustration of the interaction of the ring gear in the position of FIG. 25a with a securing device and the rotation-blocking device.

DETAILED DESCRIPTION OF THE INVENTION

Figure 1:
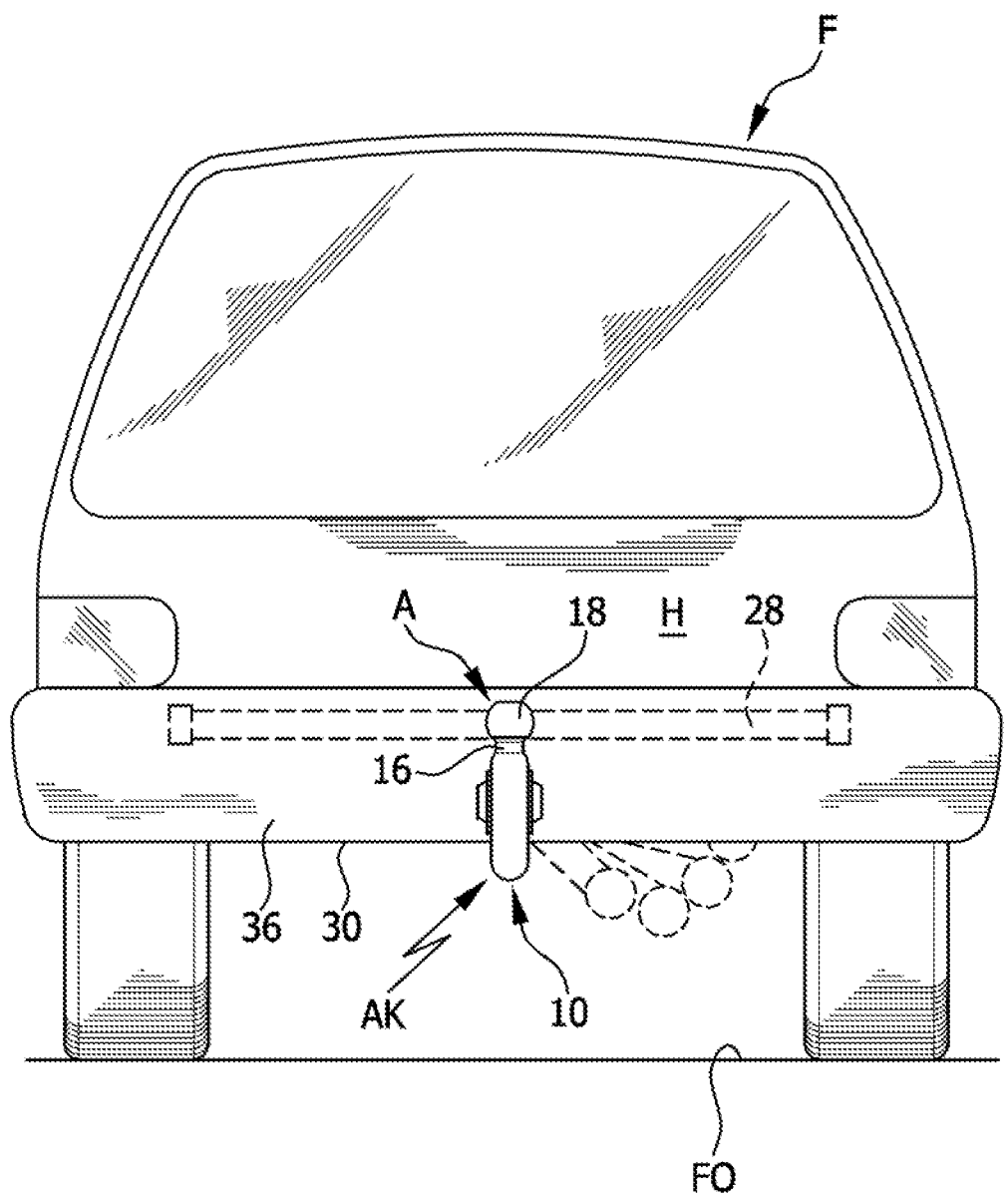
FIG. 1 sows a rear view of a motor vehicle with a trailer hitch according to the invention.
Figure 2:
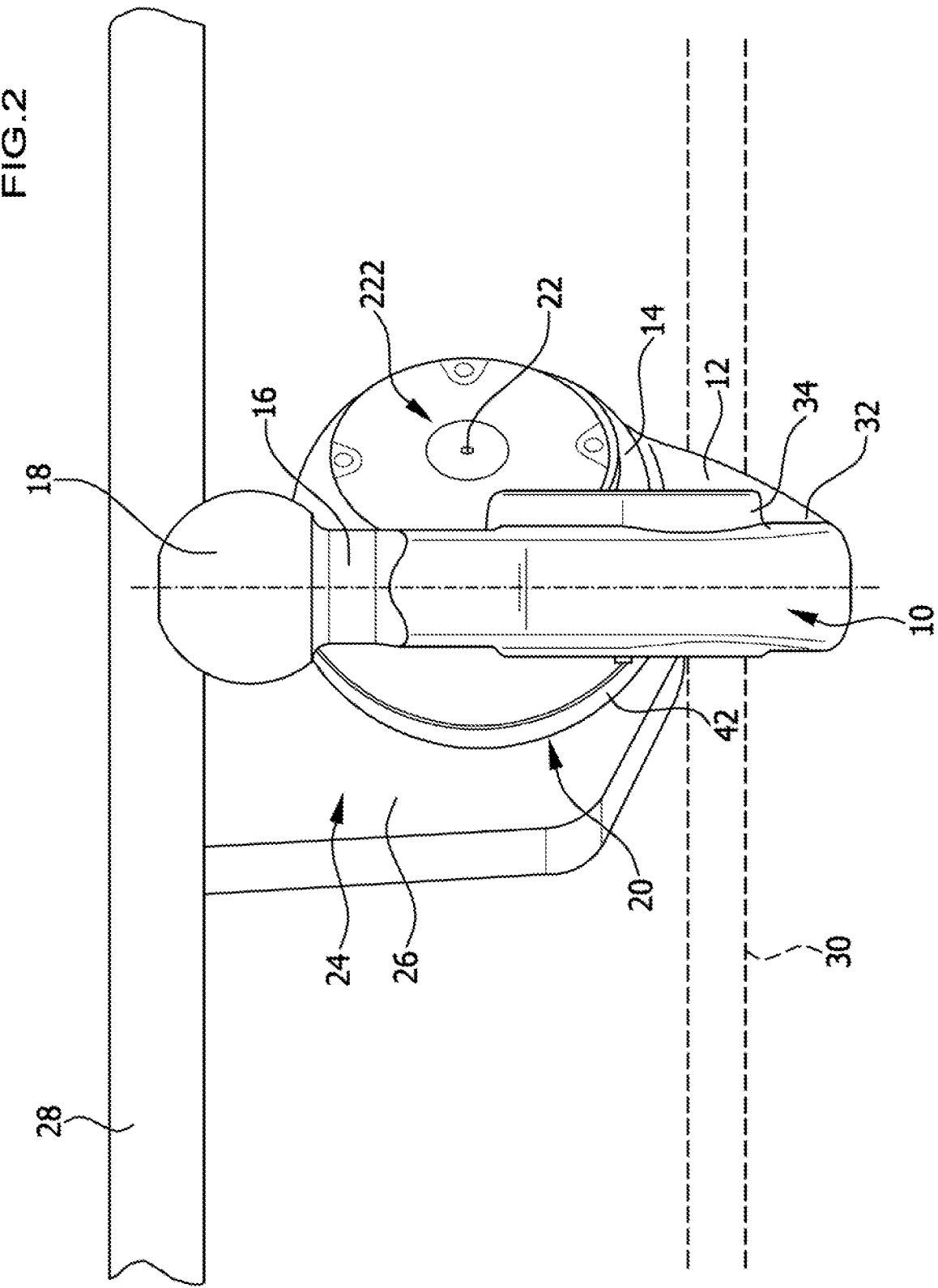
FIG. 2 shows a plan view of a first exemplary embodiment of a trailer hitch according to the invention, with a view in the direction of travel of the trailer hitch mounted on a vehicle rear, wherein the trailer hitch is in its operative position.
Figure 3:
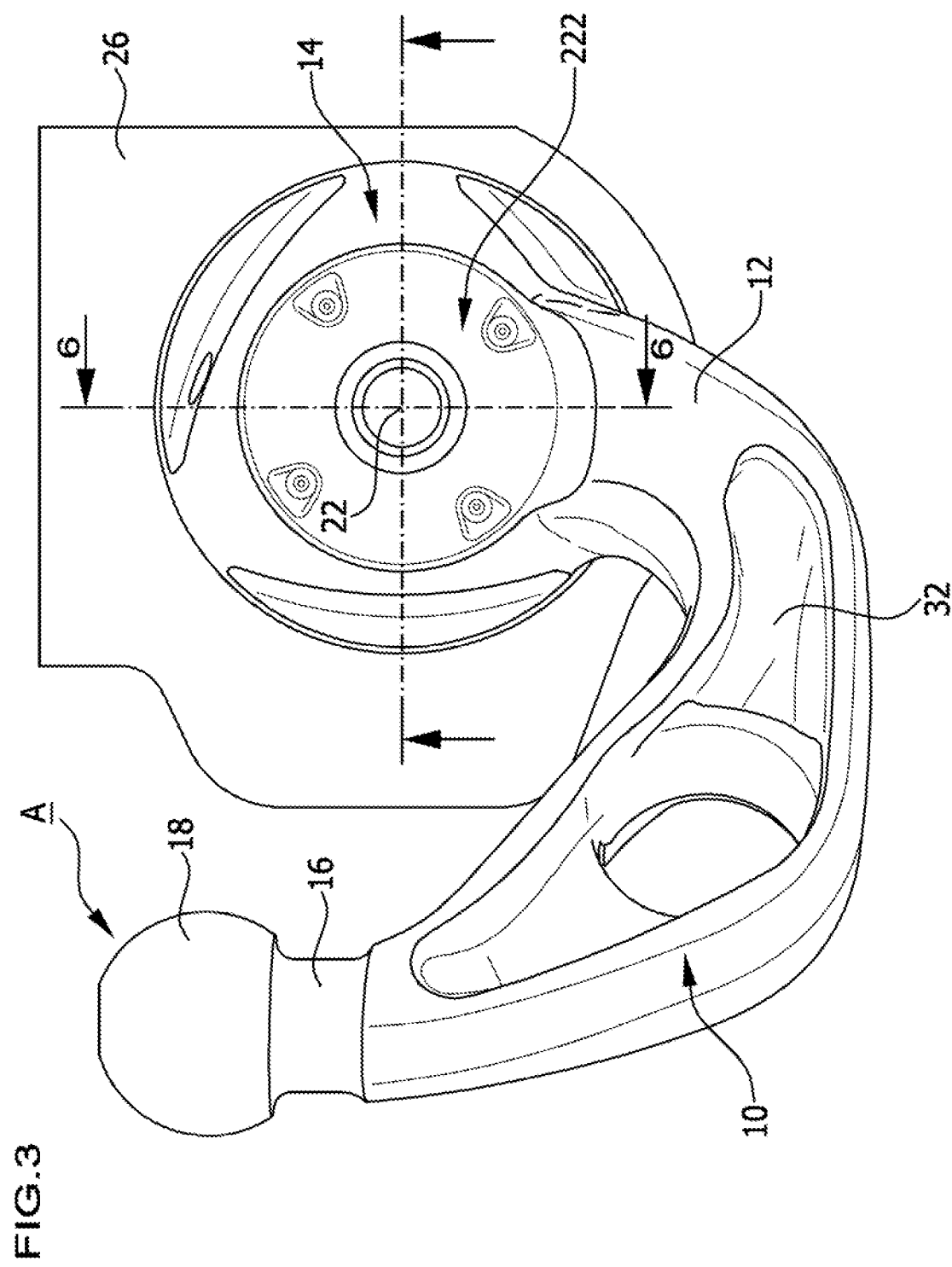
FIG. 3 shows a plan view of the trailer hitch in FIG. 2, in the direction of the pivot axis.
Figure 4:
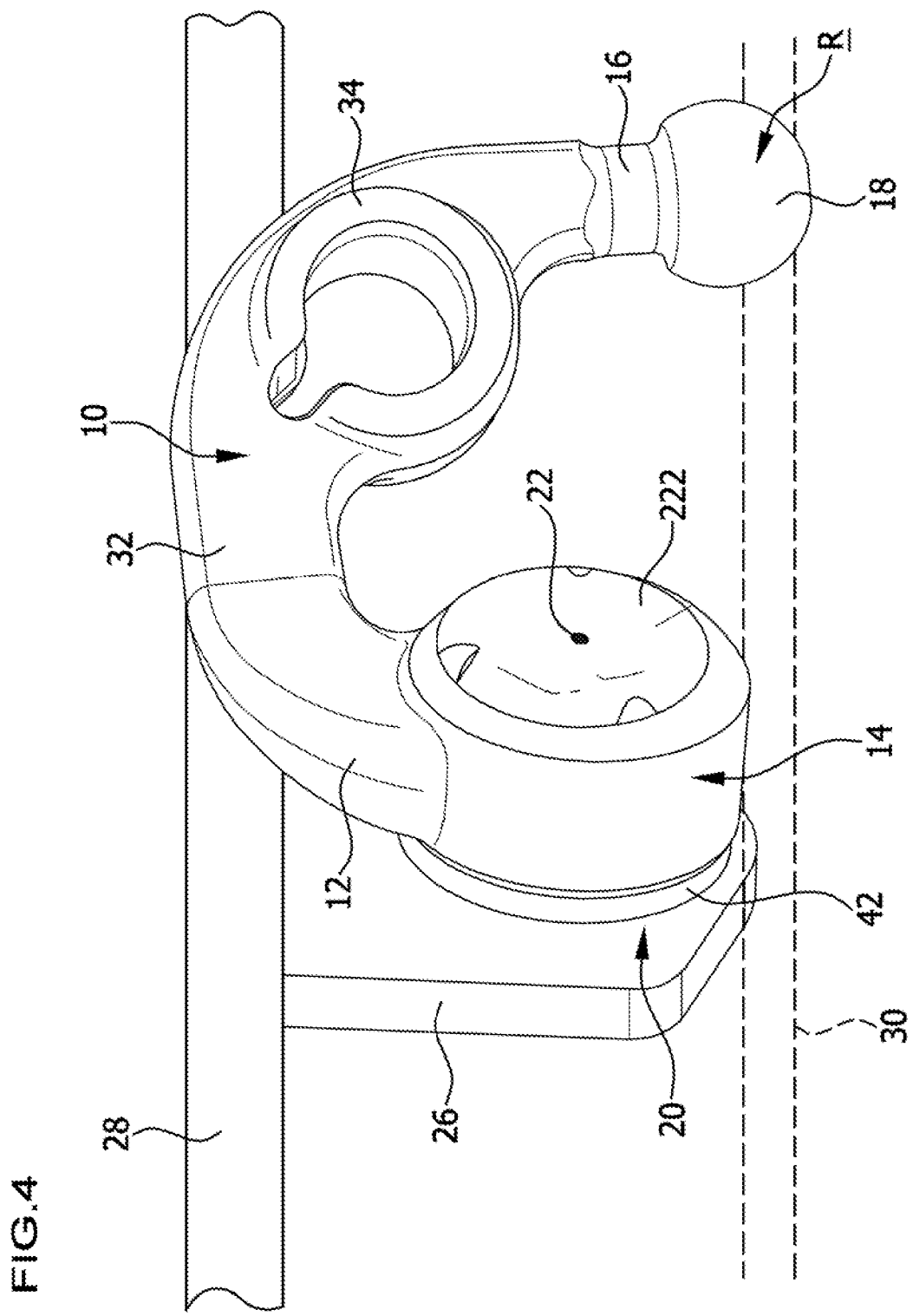
FIG. 4 shows a view corresponding to FIG. 2, of the trailer hitch in the rest position.
Figure 5:
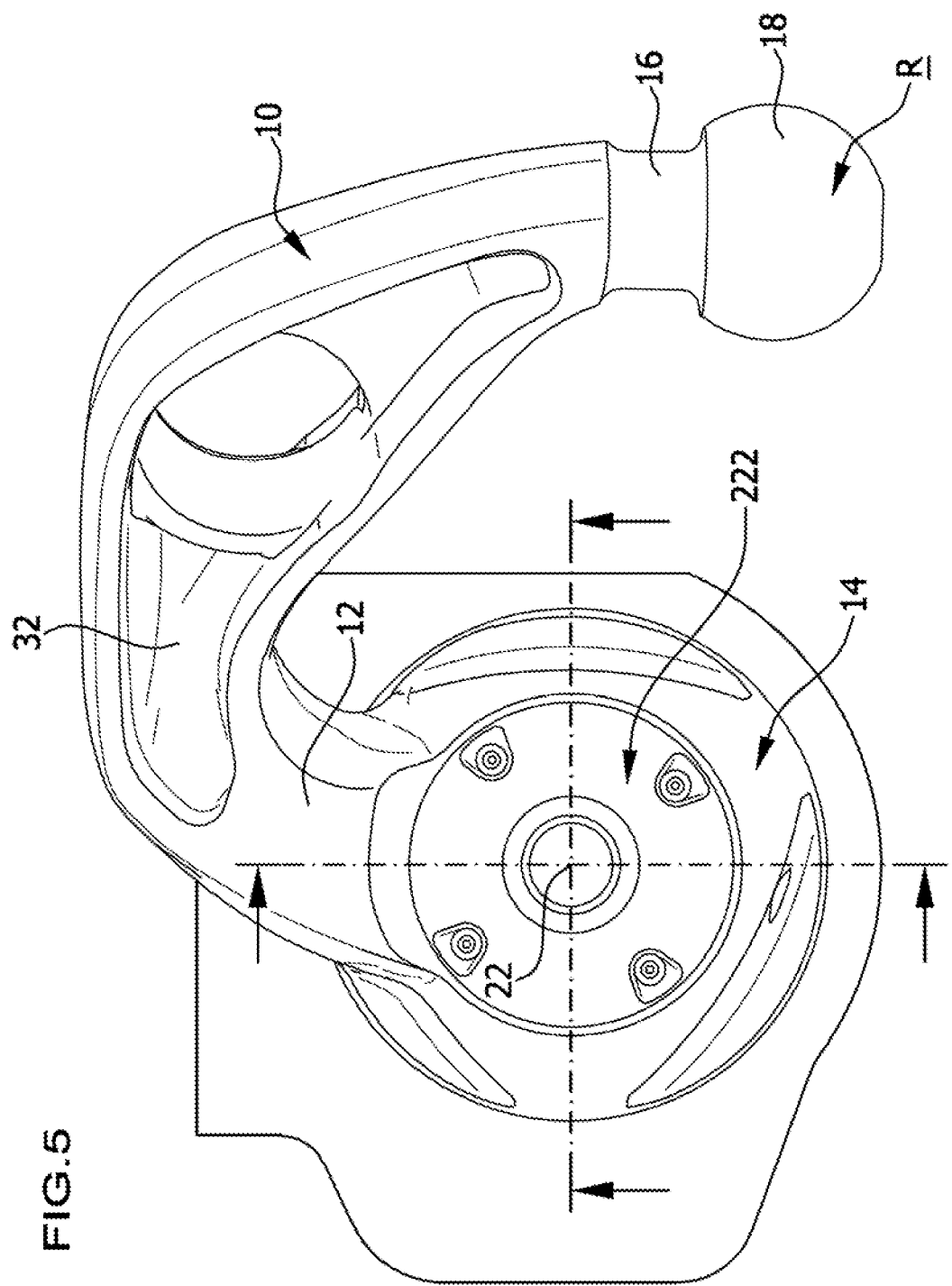
FIG. 5 shows a plan view of the trailer hitch according to the trailer hitch from FIG. 4, in the rest position, in the direction of the pivot axis.
Figure 6:
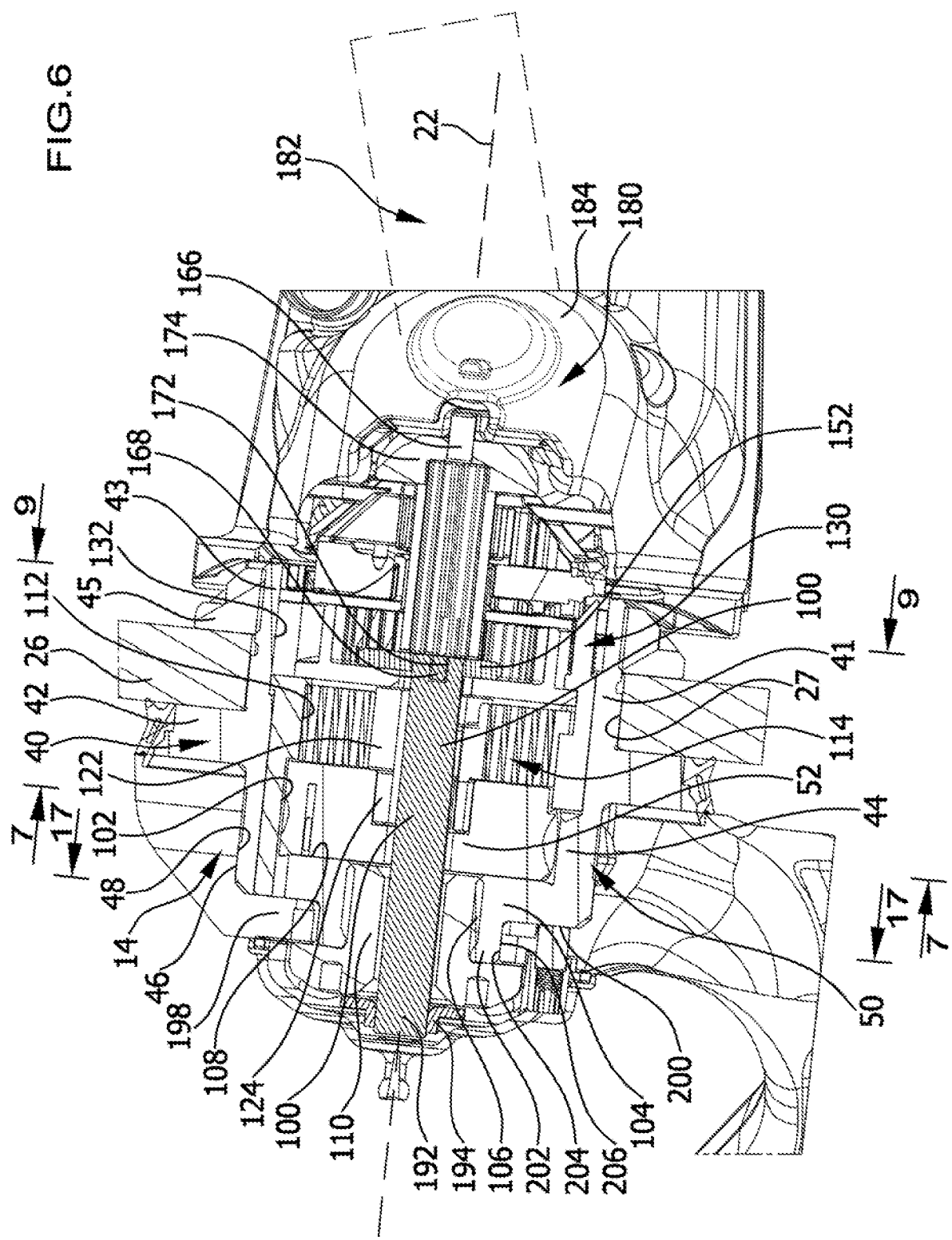
FIG. 6 shows an illustration of a section along the line 6-6 in FIG. 3.

A first exemplary embodiment of a trailer hitch AK according to the invention for a motor vehicle, which is illustrated in an operative position A in FIGS. 1, 2 and 3 and in a rest position R in FIGS. 4 and 5, comprises a ball neck, which is designated 10 as a whole, is held at a first end 12 on a pivot bearing body 14, and carries at a second end 16 a coupling ball, designated 18 as a whole, wherein a coupling ball receiver of a trailer is configured to be fixed on the coupling ball.

The pivot bearing body 14 is mounted such that it is pivotal about a pivot axis 22 in relation to a carrier 24 fixed to the vehicle, by a pivot bearing unit that is designated 20 as a whole, wherein the carrier 24 preferably has a carrier plate 26, which holds the pivot bearing unit 20 and preferably extends in a plane perpendicular to the pivot axis 22, and a transverse carrier 28, which is fixed to the vehicle and is configured to be secured in known manner to a rear region H of a vehicle body F such that the pivot bearing unit 20 and the carrier 24 are located on a side of a lower surface 30 of a bumper unit 36 that is remote from a road surface OF, and are covered by the bumper unit 36 (FIG. 2).

In the operative position, which is illustrated in FIGS. 1 and 2, the ball neck 10 engages below the lower edge 30 of the bumper unit 36 by means of a portion 32 adjoining the first end 12, such that the second end 16 and the coupling ball 18, together with a plug socket 34, are located on a side of the rear bumper unit 36 remote from the vehicle body F, whereas in the rest position both the pivot bearing unit 20 and also the entire ball neck 10, together with the coupling ball 18, are covered front view front the back by the rear bumper unit 36.

As illustrated in FIGS. 6 to 9, the pivot bearing unit 20 comprises a guide body 40, which is permanently connected to the carrier plate 26 by a flange 42, and a guide sleeve 44 that extends away from the carrier plate 26, starting from the flange 42, and on which the pivot hearing body 14 is rotatably mounted.

For this purpose, the guide sleeve 44 comprises a cylinder outer face 46 against which the pivot bearing body 14 abuts by means of a cylinder inner face 48 and hence undergoes rotary guidance around the axis 22 about the pivot axis 22, with the result that the pivot bearing body 14 is rotatable in relation to the guide body 40 such that the hall neck 10 is pivotal from the operative position A to the rest position R and vice versa.

Moreover, the guide body 40 comprises a projection 41 that extends through an aperture 27 in the carrier plate 26 and bears a receptacle 43, which succeeds the projection 41 on an opposite side to the flange 42, for a holding ring 45 that is fixable at this receptacle 43, with the result that, because of its external contour 47, which is not rotationally symmetrical but radially varying (FIG. 9), the guide body 40 is seated in the correspondingly shaped aperture 27 in the carrier plate 26 in a manner preventing rotation, as a result of positive engagement, by the projection 41 and is fixed to the carrier plate 26 by the flange 42 and the holding ring 45, which abut against the carrier plate on opposite sides.

Thus, as a result of its fixed connection to the carrier plate 26 and the carrier 24, the guide body 40 forms the rotary mounting in a manner fixed to the vehicle for the pivot bearing body 14.

For the purpose of fixing the pivot bearing body 14 in the operative position A, the pivot bearing unit 20 is provided with a rotation-blocking device, designated 50 as a whole (FIG. 7), comprising an actuation body 52, a plurality of rotation-blocking bodies 54 that are urgeable by the actuation body 52 and of which each is guided such that they are movable in a guide receptacle 56 in the guide sleeve 44 in a guide direction 58 extending substantially radially in relation to the pivot axis 22, and—starting from the inner face 48 of the pivot bearing body 14 and extending into it—receptacles 60 with which the rotation-blocking bodies 54 are configured to be brought into engagement in the operative position A, wherein the receptacles 60 have wall faces that are at a smaller spacing from one another the greater their radial distance from the pivot axis 22.

Figure 7:
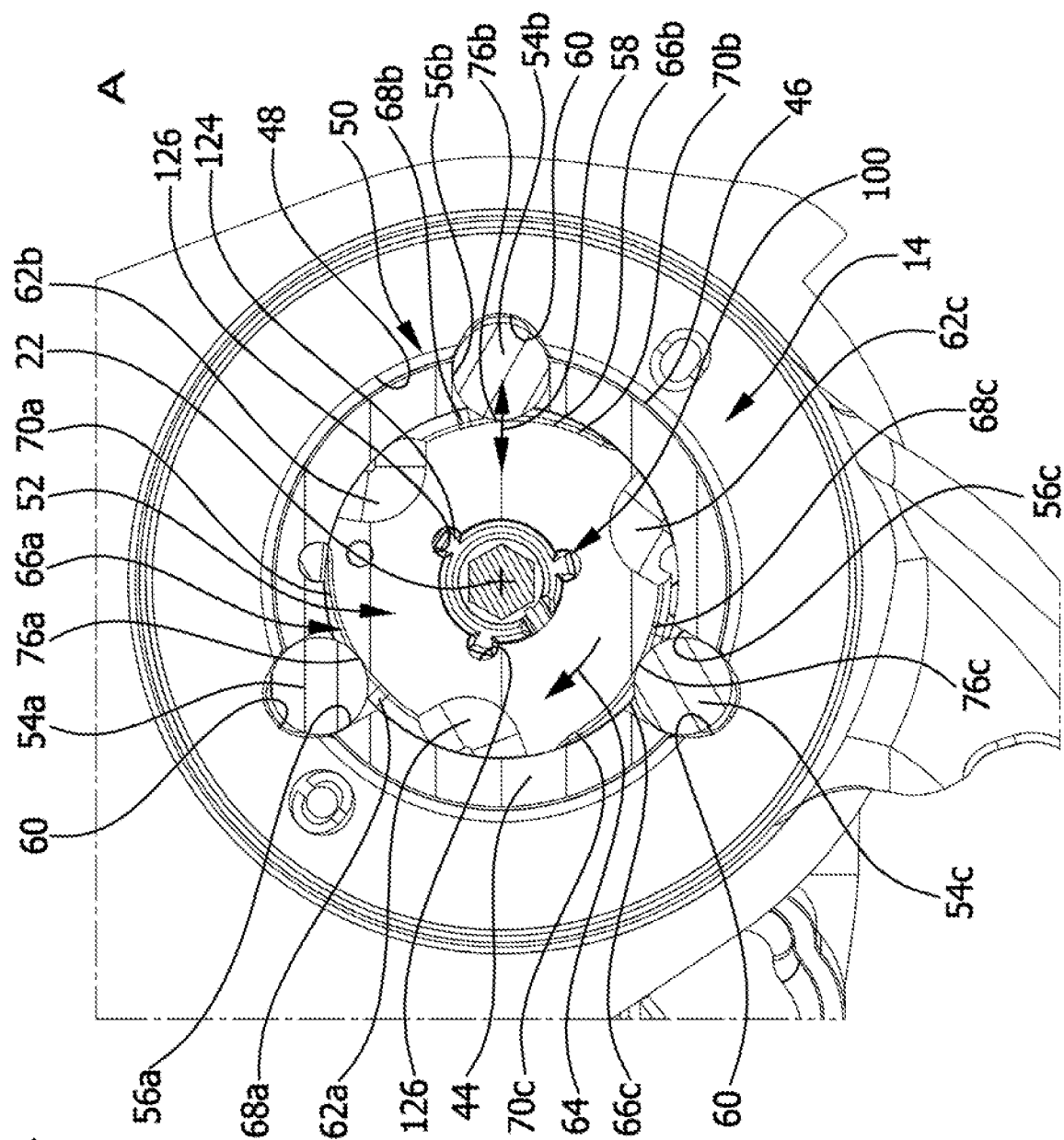
FIG. 7 shows a section along the line 7-7 in FIG. 6, in the operative position.
Figure 9:
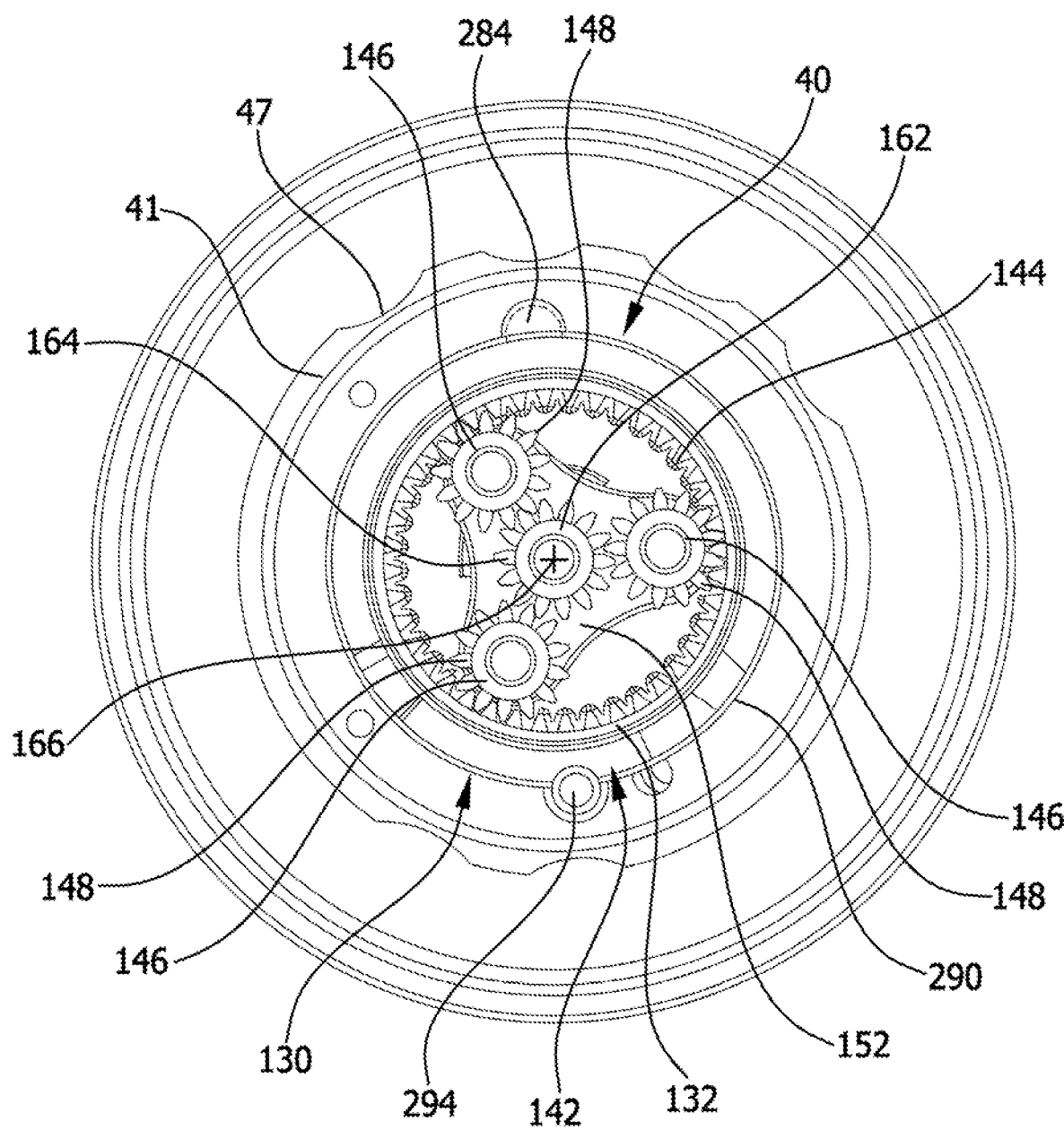
FIG. 9 shows a section along the line 9-9 in FIG. 6, without the carrier plate or the holding ring.

For example, if—as illustrated in the first exemplary embodiment in connection with FIG. 7 and FIG. 9—the rotation-blocking device 50 comprises a set of three rotation-blocking bodies 54a, 54b and 54c, then the guide sleeve 44 has a corresponding set of three guide receptacles 56a, 56b and 56c into which the rotation-blocking bodies 54a, 54b and 54c are guided in a manner displaceable in the guide direction 58, which extends substantially radially in relation to the pivot axis 22, and the pivot bearing body 14 is provided with a set of first receptacles 60a, 60b and 60c with which the rotation-blocking bodies 54a, 54b and 54c are configured to engage in the operative position A.

For the purpose of suitably moving and positioning the rotation-blocking bodies 54 in the guide direction 58, the actuation body 52 is provided with a set, corresponding to the number of rotation-blocking bodies 54, of a total of three retraction receptacles 62a, 62b and 62c and three pressure surfaces 66a, 66b and 66c that adjoin the retraction receptacles 62a, 62b, 62c in a direction of revolution 64 and take the form of wedge faces acting radially in relation to the pivot axis 22, wherein, in their release position, the rotation-blocking bodies 54 can penetrate far enough into the retraction receptacles 62a, 62b and 62c (FIG. 8) for them no longer to project beyond the Outer face 46 of the guide sleeve 44, and wherein the pressure surfaces 66a, 66b, 66c each extend increasingly radially outward in relation to the pivot axis 22 from a radially inward starting region 68a, 68b and 68c that directly adjoins the respective retraction receptacles 62 as their extent in the direction of revolution 64 increases as far as a radially outward end region 70a, 70b and 70c and thus, when there is a rotary movement of the actuation body 52, act as wedge faces on the rotation-blocking bodies 54 in order to move them into their rotation-blocking position.

Preferably in this case, the pressure surfaces 66 extend in the manner of spiral or involute segments in relation to the pivot axis 22.

Figure 8:
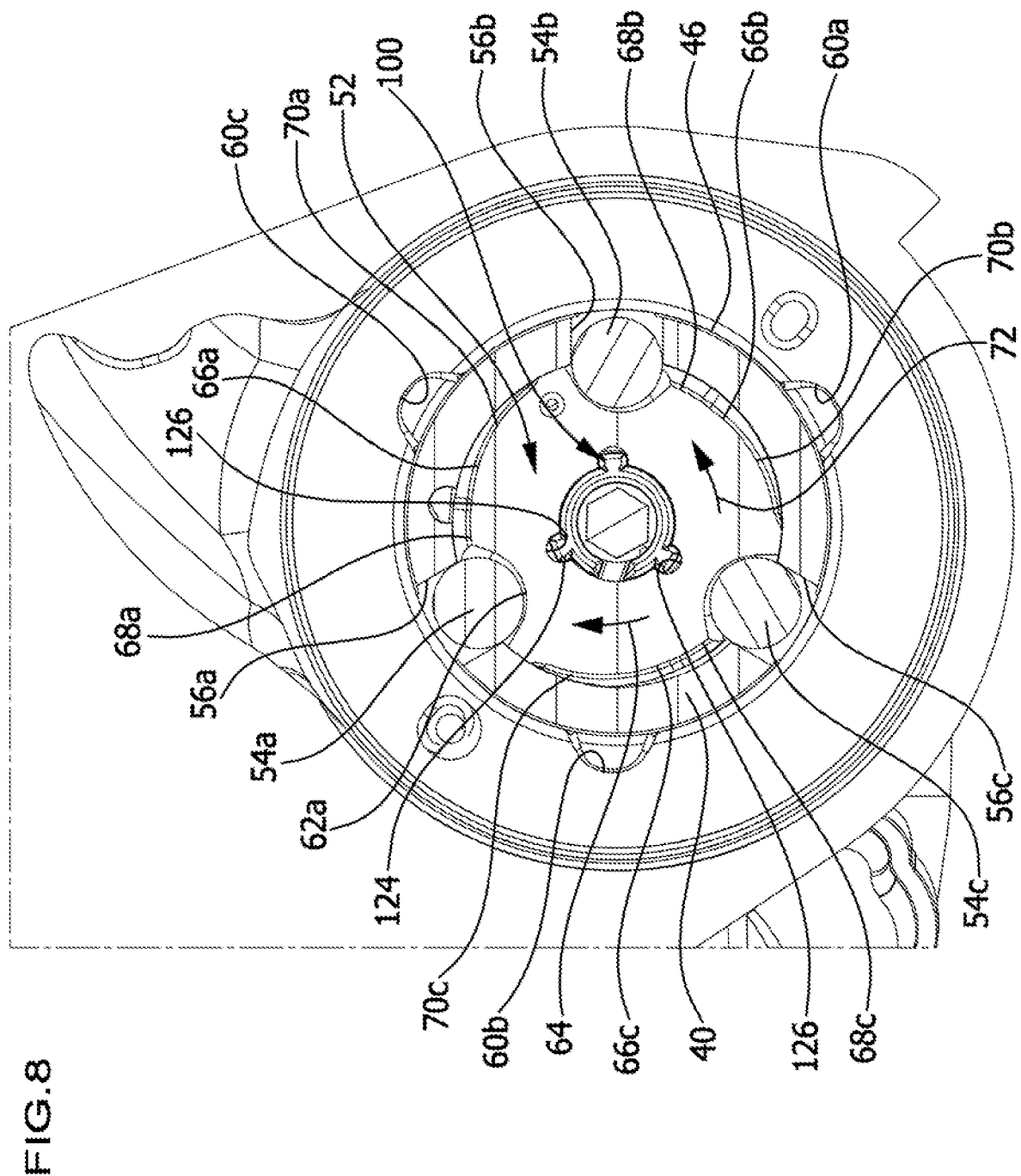
FIG. 8 shows a illustration of a section similar to FIG. 7, in the rest position.

In order either to keep the rotation-blocking bodies 54 in their rotation-blocking position as a result of their being urged by the pressure surfaces 66 between the starting region 68 and the end region 70, or to allow them to penetrate into the retraction receptacle 62 in the release position, the actuation body 52 is likewise rotatable about the pivot axis 22, in particular coaxially thereto, such that either the set of retraction receptacles 62a, 62b and 62c faces the rotation-blocking bodies 54 and—as illustrated in FIG. 8—in its inactive position allows these to penetrate into the retraction receptacles 62 in the radial direction toward the pivot axis 22 in order to enable the respective rotation-blocking bodies 54 to release the first receptacles 60, together with the pivot bearing body 14, in respect of a rotation about the pivot axis 22 in relation to the guide body 40, such that the pivot bearing body 14 and with it the ball neck 10 is freely and unimpededly rotatable in relation to the guide sleeve 44—as illustrated in FIG. 8—in which case the rotation-blocking bodies 54 do not extend beyond the outer face 46 of the guide sleeve 44.

Rotating the actuation body 52 in a direction of rotation 72 in opposition to the direction of revolution 64 when the rotation-blocking bodies 54 are seated in the retraction receptacles 62 has the effect that the rotation-blocking bodies 54 are moved out of the retraction receptacles 62 and first, in the active position of the actuation body 52, lie on the starting regions 68 of the pressure surfaces 66 but in so doing penetrate for example into the first receptacles 58 and hence prevent the pivot bearing body 14 from being able to rotate freely in relation to the guide body 40.

If the actuation body 52 is turned further in the direction of rotation 72, in opposition to the direction of revolution 64, then regions of the pressure surfaces 66 that lie further and further radially outward in relation to the pivot axis 22 act on the rotation-blocking bodies 54, and thus, in the operative position A of the ball neck 10, push the rotation-blocking bodies 54 more and more into the first receptacles 60a, 60b and 60c (FIG. 7), in order in this way to achieve substantially play-free fixing of the pivot bearing body 14 in relation to the guide body 40, in this case in relation to the guide sleeve 44.

In the rotation-blocking, position of the rotation-blocking bodies 54, the actuation body 52 is in its active position in such a way that—as illustrated in FIG. 7—the rotation-blocking bodies 54 lie approximately on central regions 76, which are located between the starting regions 68 and the end regions 70, of the pressure surfaces 66 and are urged thereby.

In order to enable the actuation body 52 to urge each of the three rotation-blocking bodies 54 in optimum manner, it is provided for the actuation body 52 to be centered in the active position in a manner corresponding with the position of the rotation-blocking bodies 54. In particular, the actuation body 52 is mounted in the guide sleeve 44 such that, because of the radial play, the actuation body 52 can center itself relatively within the guide body 40 in a manner corresponding with the position of the rotation-blocking bodies 54, which is conditional on manufacturing tolerances, wherein the self-centering of the actuation body 52 can differ slightly from a coaxial arrangement in respect of the geometric pivot axis 22.

As a result of the self-centering, the rotation-blocking bodies 54a, 54b and 54c act on the receptacles 60a, 60b and 60c in the respective guide direction 58a, 58b and 58c with approximately equal forces, with the result that the reaction forces acting on the actuation body 52 are also approximately equal.

In the illustrated exemplary embodiment of the solution according to the invention, the rotation-blocking bodies 54 are arranged in the guide receptacles 56 at equal angular spacings about the pivot axis 22, with the result that the reaction forces on one of the rotation-blocking bodies 54a, 54b, 54c, which as a result of the self-centering are approximately equal, act in equal parts on the other rotation-blocking bodies 54b and 54c, 54a and 54c and 54a and 54b and thus overall cancel one another out, with the result that the actuation body 52 is in force equilibrium and there is no need for additional support.

Preferably, the rotation-blocking bodies 54 are ball-shaped, and thus abut on the one hand against the actuation body 52 and on the other also against the receptacles 60.

As a result, the actuation body 52 is mounted in relation to the pivot axis 22 only with play, and this is primarily of relevance when the actuation body 52 is holding the rotation-blocking bodies 54 in a release position in which the rotation-blocking bodies 54 penetrate into the retraction receptacles 62 of the actuation body 52.

In order to cause the actuation body 52 always to move in the direction of rotation 72 without any external influence while the rotation-blocking bodies 54 move in the direction of the rotation-blocking position, the actuation body 52 is urged by a torsion spring 114 (FIG. 6) that acts on one side on the actuation body 52 and is radially outwardly supported against the guide body 40 on the other side.

The torsion spring 114 also has the effect that the actuation body 52 pushes the rotation-blocking bodies 54 into the receptacles 60 under three and thus the pivot bearing body 14 is fixed without play, wherein the freedom from play is maintained even if the geometry of the receptacles 60 changes during operation under load as a result of the actuation body 52 rotating further in the direction of rotation 72.

The guide sleeve 44 extends, by means of a portion forming a receptacle 102 for the actuation body 52, between the flange 42 and a flange 104, which terminates the guide sleeve 44 radially toward the pivot axis 22, is preferably formed in one piece with the guide sleeve 44 and delimits the receptacle 102 for the actuation body 52, with the result that the actuation body 52 is guided radially in relation to the pivot axis 22 through the receptacle 102 in the guide sleeve 44 and is guided axially, as seen in the direction of the pivot axis 22, as a result of abutting against an inner side 1013 of the cover 104.

The flange 104 further has a receptacle 106, which is coaxial in relation to the pivot axis 22 and into which there is inserted, in particular being screwed, an insert 110, which is seated in the receptacle 106 and through which a pivotal drive shall 100 passes.

On an opposite side of the receptacle 102 for the actuation body 52 to that with the flange 104, the guide sleeve 44 forms, for example by means of a portion passing through the flange 42, a torsion spring receptacle 112 in which, adjoining the actuation body 52, there is arranged the torsion spring 114, which is fixed at one end, by an outer end, in the torsion spring receptacle 112 and, by an inner end, to a drive sleeve 122 that is coupled to the actuation body 52 in a manner preventing rotation in relation thereto.

Figure 10:
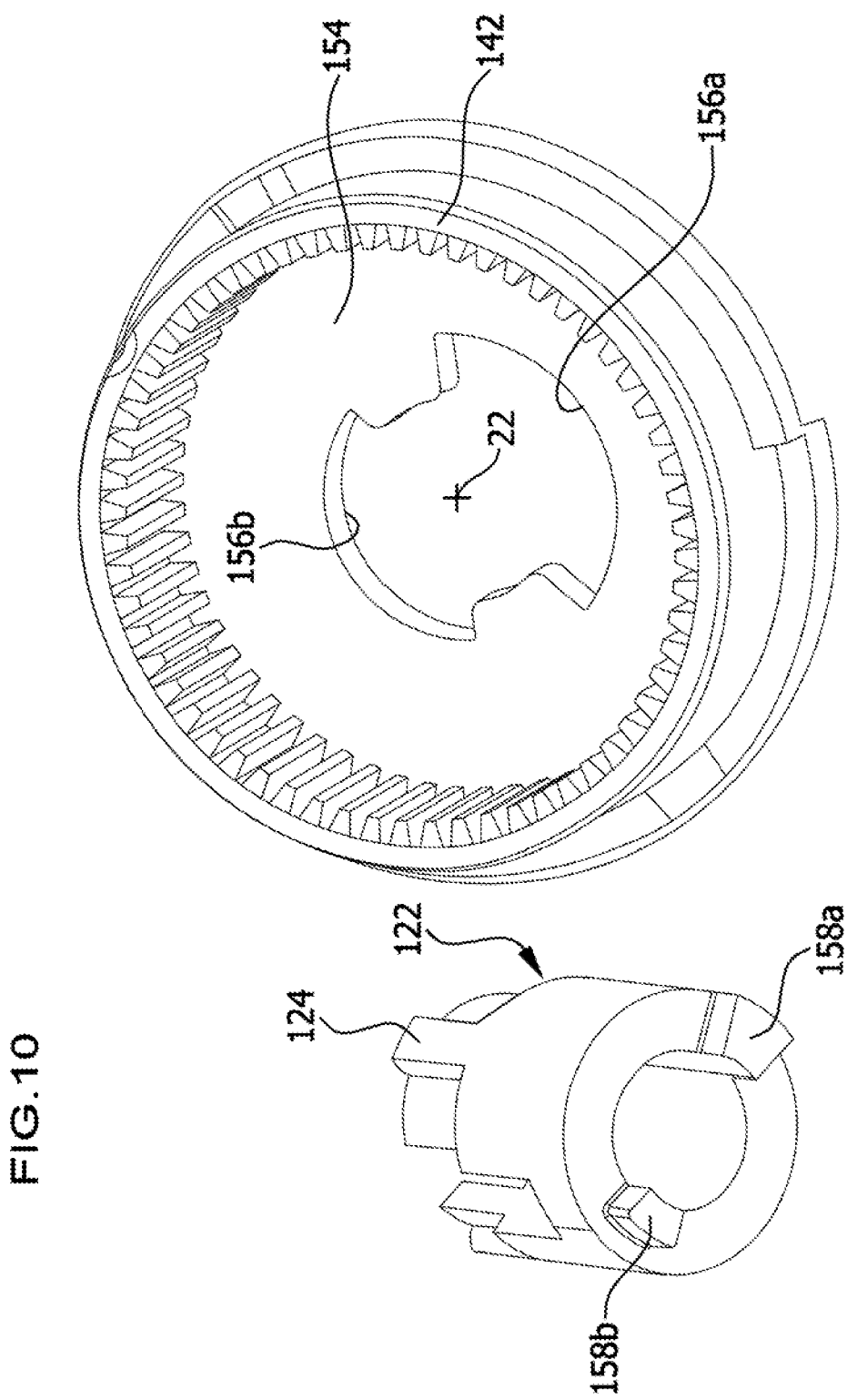
FIG. 10 shows a perspective illustration of a ring gear and a drive sleeve cooperating therewith.
Figure 11:
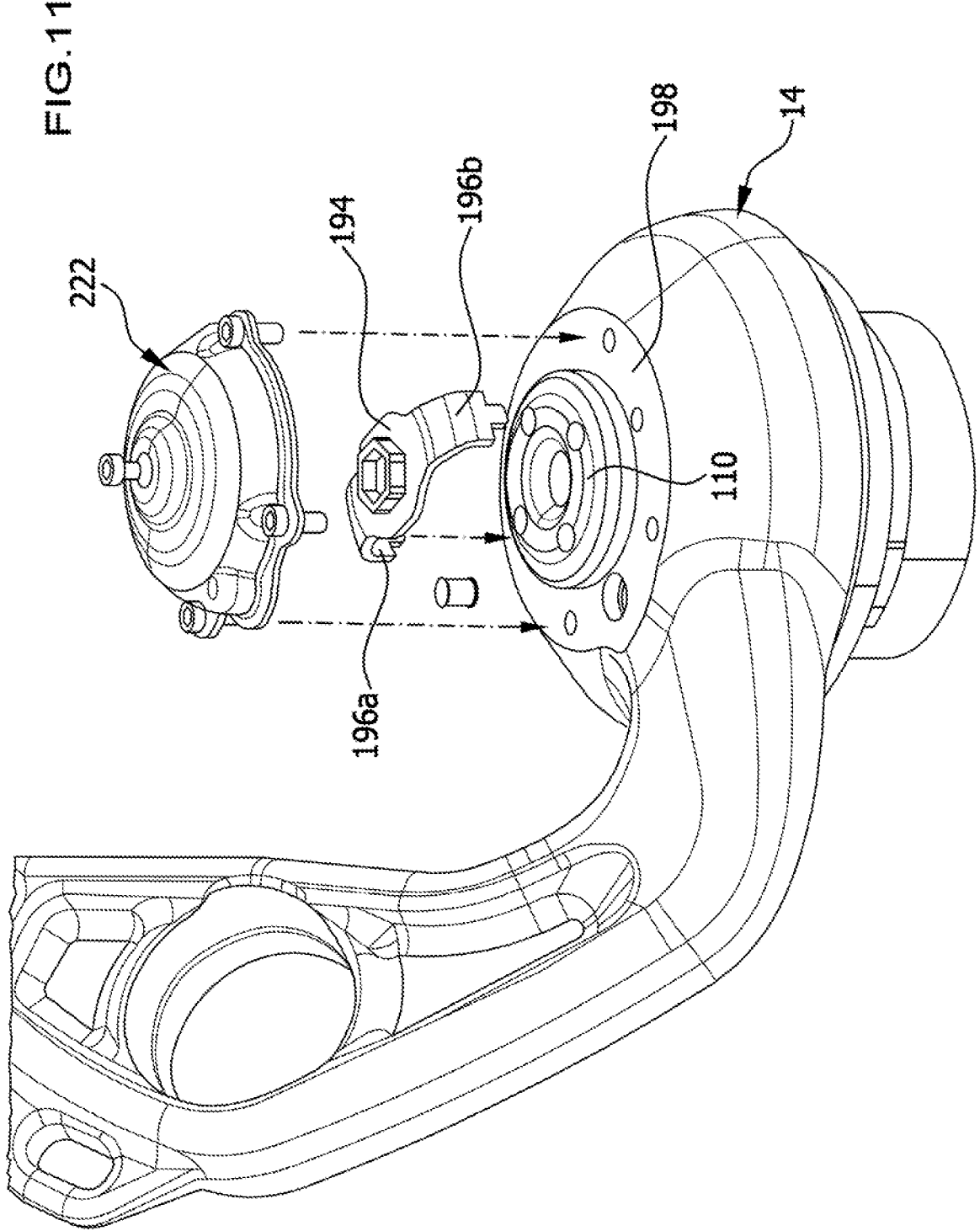
FIG. 11 shows a perspective exploded illustration of the pivot bearing body, with the cover.

For this purpose, the drive sleeve 122, as illustrated in FIGS. 10 and 11, is provided for example with projections 124 that, for the purpose of making a positively locking connection, engage in corresponding recesses 126 in the actuation body 52.

Because the torsion spring 114 acts on the drive sleeve 122, which is coupled to the actuation body 52 in a manner preventing rotation in relation thereto, the action of the torsion spring 114 on the drive sleeve 122 drives the actuation body 52 in the direction of rotation 72 with the result that if the torsion spring 114 acts unimpededly on the drive sleeve 122 the actuation body 52 always urges the actuation body 52 such that it tends to press the rotation blocking bodies 54 into the receptacles 60 under force loading and thus to fix the pivot bearing body 14 in a manner preventing rotation in relation to the guide sleeve 44, in particular without play.

So that the rotation-blocking bodies 54 can be moved into the release position, action on the actuation body 52 in opposition to the direction of rotation 72 and thus also in opposition to the action of the torsion spring 114 is required.

For this purpose, the drive sleeve 122 is drivable by means of a planetary gear 130, which is designated 130 as a whole (FIG. 6) and is arranged in a gear seating 132 in the guide sleeve 44, in particular coaxially in relation to the pivot axis 22, which is arranged for example partly within the aperture 27 in the carrier plate 26 and preferably extends away from the aperture 27 in the carrier plate 26 on an opposite side to the flange 42.

The planetary gear 130 (FIG. 9) for its part comprises a ring gear 142 that is guided in the gar seating 132 and is provided with an internal toothing 144 by means of which planet wheels 146 engage by means of their external toothing 148.

Here, the planet wheels 146 are held such that they are rotatable on a planet wheel carrier 152, which for its part is connected to the pivotal drive shall 100 in a manner preventing rotation in relation thereto such that the planet wheel carrier 152 forms a take-off element of the planetary gear 130 for performing pivoting of the ball neck 10.

Further—as illustrated in FIG. 10—the ring gear 142 comprises a flanged body 154 located between the planet wheel carrier 152 and the torsion spring 114 and likewise extending in the direction of the pivotal drive shaft 100, which it surrounds but is rotatable in relation thereto, and represents a take-off of the planetary gear 130 for the purpose of actuating the rotation-blocking device 50.

As illustrated in FIG. 10, the flanged body 154 has arcuate drive slots 156a, 156b that are arranged around the pivot axis 22 and cooperate with drive fingers 158a, 158b on the drive sleeve 122 engaging in them, and yet are formed such that, as a result of the difference between the angular range about the pivot axis 22 over which the drive slots 156 extend and the angular range about the pivot axis 22 over which the drive fingers 158 extend, the drive sleeve 122 is able to run freely in relation to the ring gear 142, in a manner that is explained in detail below.

Further, the planet wheels 146 engage by means of their external toothing 148 with an external toothing 164 of a sun wheel 162 of the planetary gear 130, wherein the still wheel 162 is seated on a drive shaft that is designated 166 as a whole and is arranged coaxially in relation to the pivot axis 22 and, for example by means of an end-face shaft journal 168 engaging in an end-face bore 172 in the pivotal drive shaft 100, is freely rotatable relative to the pivotal drive shaft 100 but is mounted coaxially in relation thereto.

At a spacing from the planetary gear 130, the drive shaft 166 carries a drive gearwheel 174, for example a cone gear wheel, which is driven by a take-off gearwheel and a motorized drive unit 182 that comprises for example on the one hand a drive motor, preferably an electric motor, and on the other a step-down gear for driving the drive gearwheel.

The drive unit 182 is held for example on a cover body 184, which—starting from the carrier plate 126—engages over the drive shaft 166 with the drive gearwheel 174 and the take-off gearwheel that meshes therewith, and moreover provides a mounting for the drive shaft 166 on a side remote from the shaft journal 168.

In this way, the Planetary gear 130 and the drive unit 182 form for example among other things an actuation device 180 for the rotation-blocking device 50.

The pivotal drive shaft 100, which is coupled to the planet wheel carrier 152 in a manner preventing rotation in relation thereto, passes through the flange 104 of the guide body 40—as described above—and is coupled, in a manner preventing rotation in relation thereto, to a drive body 194, at an end 192 projecting beyond the insert 110, wherein the drive body 194 has two drive arms 196*a* and 196*b* that extend in the direction of an end flange 198 of the pivot bearing body 14, which engages over an external region 200 of the flange 104 of the guide body 14, and in so doing the drive arms 196*a* and 196*b* engage positively in recesses therein in order to make a connection between the drive body 194 and the guide body 14 in a manner preventing rotation.

Here, the end flange 198 engages over the flange 104 of the guide body 40 in the external region 200 and extends as far as a guide attachment 202 of the flange 104, wherein the end flange 198 embraces, for example by means of a radially inner cylinder face 204, an outer cylinder face 206 of the guide attachment 202 and for example abuts against it and as a result is likewise additionally guided on the guide attachment 202, coaxially in relation to the pivot axis 22.

Moreover, extending in the receptacle 106 in the guide attachment 202 there is a thread 212 into which there is fixed, in particular screwed, the insert 110, which partially engages, by means of an outer flange 214, over the end flange 198 in a radially inner region, with the result that the end flange 198 of the pivot bearing body 14 is guided axially non-displaceably between the flange 104 and the outer flange 214 of the insert 110 and hence is axially non displaceable in relation to the guide body 40.

Mounted in a manner preventing rotation on the end flange 198 there is furthermore a cover 222 that engages over the drive body 194 having the drive arms 196 and forms a bearing receptacle 224 for the end 192 of the guide shaft 100, with the result that the cover 222 forms with the pivot bearing body 14 a unit that is rotatable about the pivot axis 22 (FIG. 11).

Here, the cover 222 is seated on the end flange 198 and is fixed thereto in a manner preventing rotation.

Figure 14:
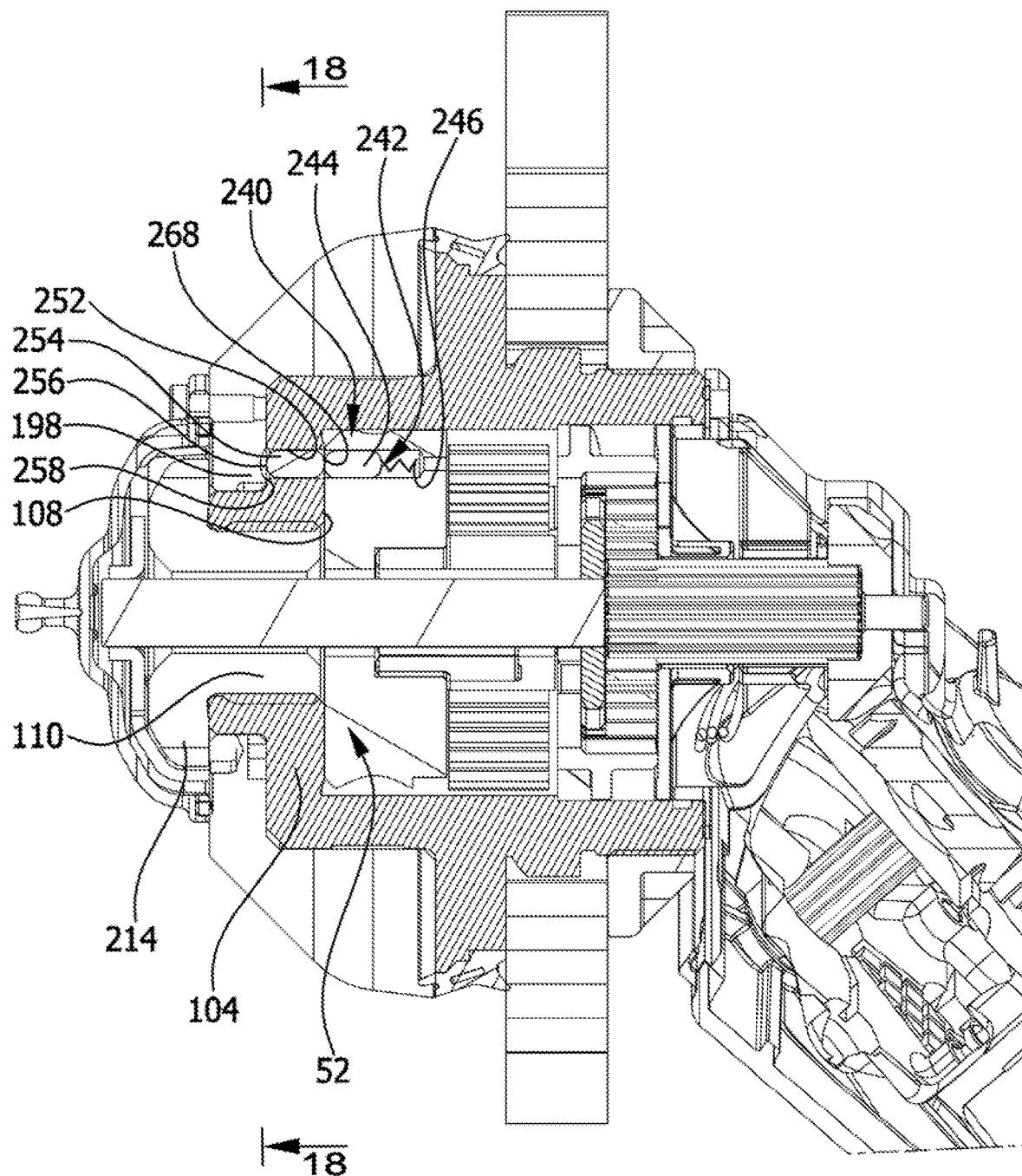
FIG. 14 shows a section alone the line 14-14 in FIG. 18.
Figure 15:
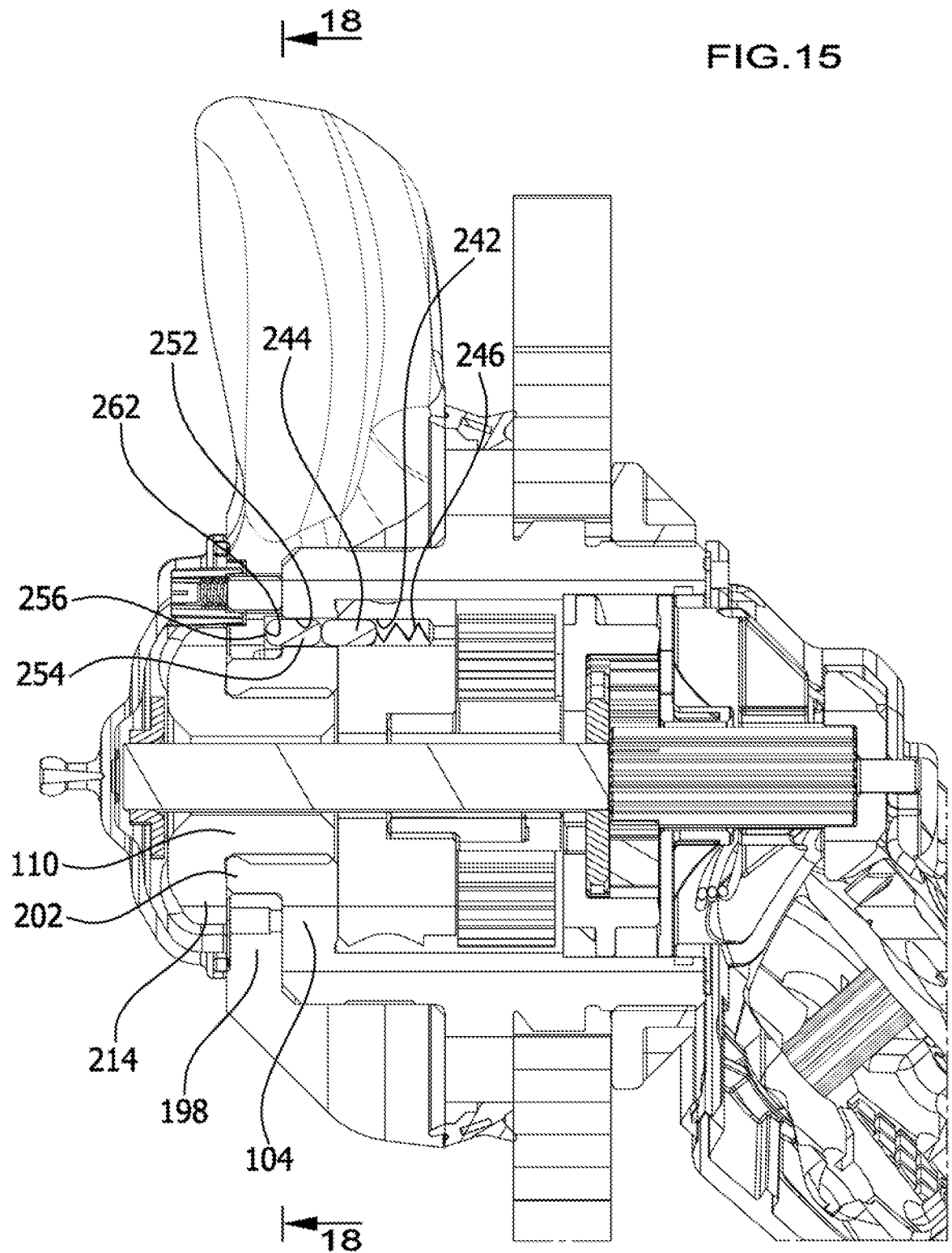
FIG. 15 shows a section alone the line 15-15 in FIG. 17.
Figure 16:
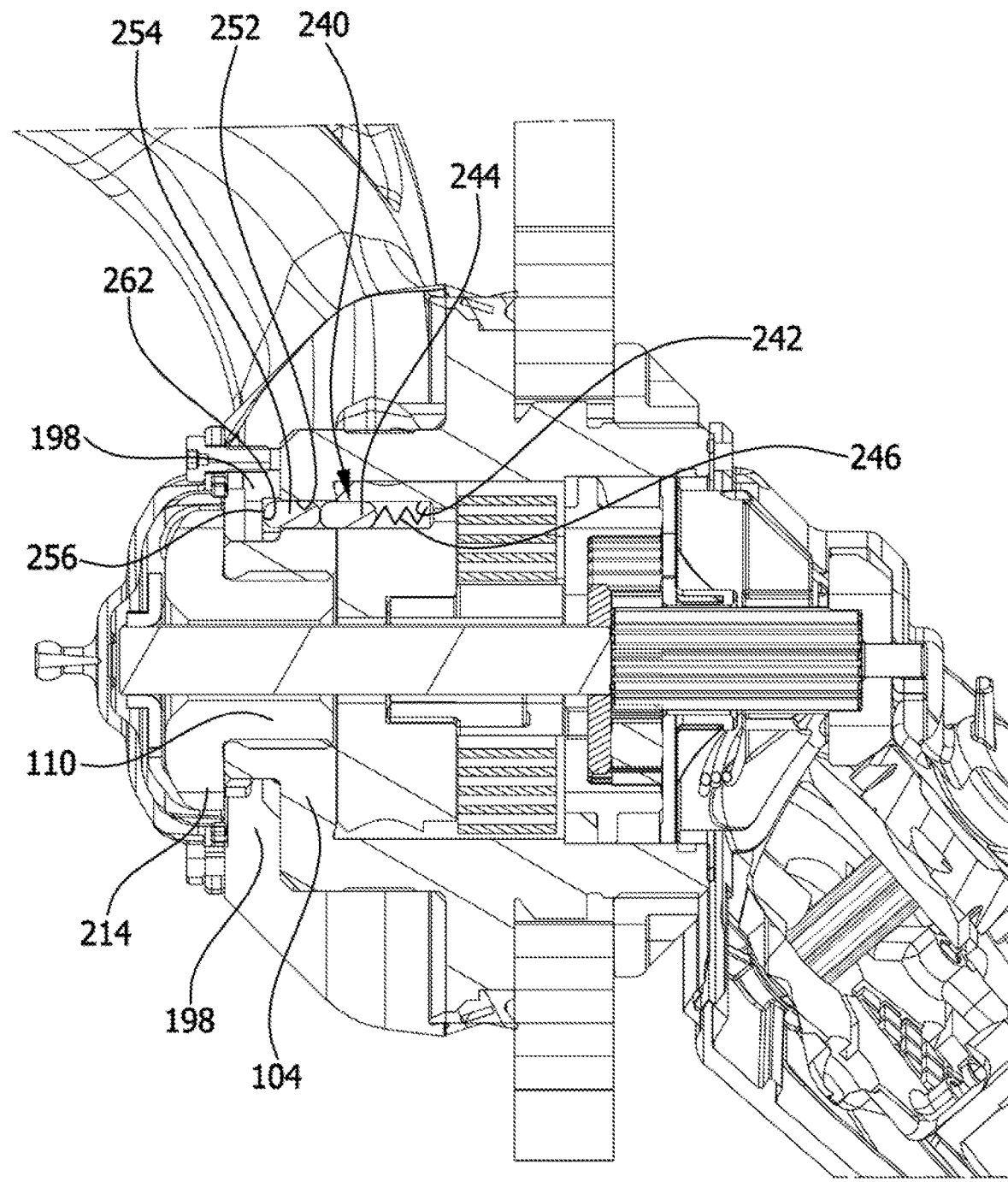
FIG. 16 shows a section similar to FIG. 15, turned further in the direction of the rest position.

For the purpose of fixing the actuation body 52 in the release position, there is provided a release position latching device 240 illustrated in FIGS. 14 to 17, which comprises for example a latching body 244 that is arranged in a bore 242 in the actuation body 52, is movable in a latching direction parallel to the bore 242, and is urged by a spring unit 246 in the direction of a latching position and can thus move from a latch release position, illustrated in FIG. 14, into the latching position, illustrated in FIGS. 15 and 16, and can engage in a latching receptacle 252 in the flange 104, which takes the form of a latching bore, when the actuation body 52 is in the release position illustrated for example in FIG. 8.

That is to say that the spring 246 urges the latching body 244 in the direction of the flange 104, with the latching body 244 having no latching effect while it slides along the inner side 108 of the flange 104 outside the latching receptacle 252, during movement of the actuation body 52.

Only once rotation of the actuation body 52 relative to the flange 104 has proceeded far enough for it to be in the release position can the latching body 244 engage in the latching receptacle 252 and thus fix the actuation body 52 in the release position, with the result that, despite the action of the torsion spring 114, the actuation body 52 cannot move back into the rotation-blocking position illustrated in FIG. 7 (FIGS. 15, 16).

So that the latching body 244 can be moved out of its latching position, in which it engages in the latching bore 252, and back into the latch release position and in order thus to deactivate the release position latching device 240, there is arranged in the latching receptacle 252 a sensor body 254 that uses a sensor head 256 to scan a flange side 258 of the end flange 198 facing the flange 104, wherein the flange side 258 has an activation face 262 of an actuation camming guide 260 that takes the form for example of a recess, with which the sensor head 256 of the sensor body 254 cooperates when this is to permit latching of the latching body 244 with the latching bore 252.

Figure 17:
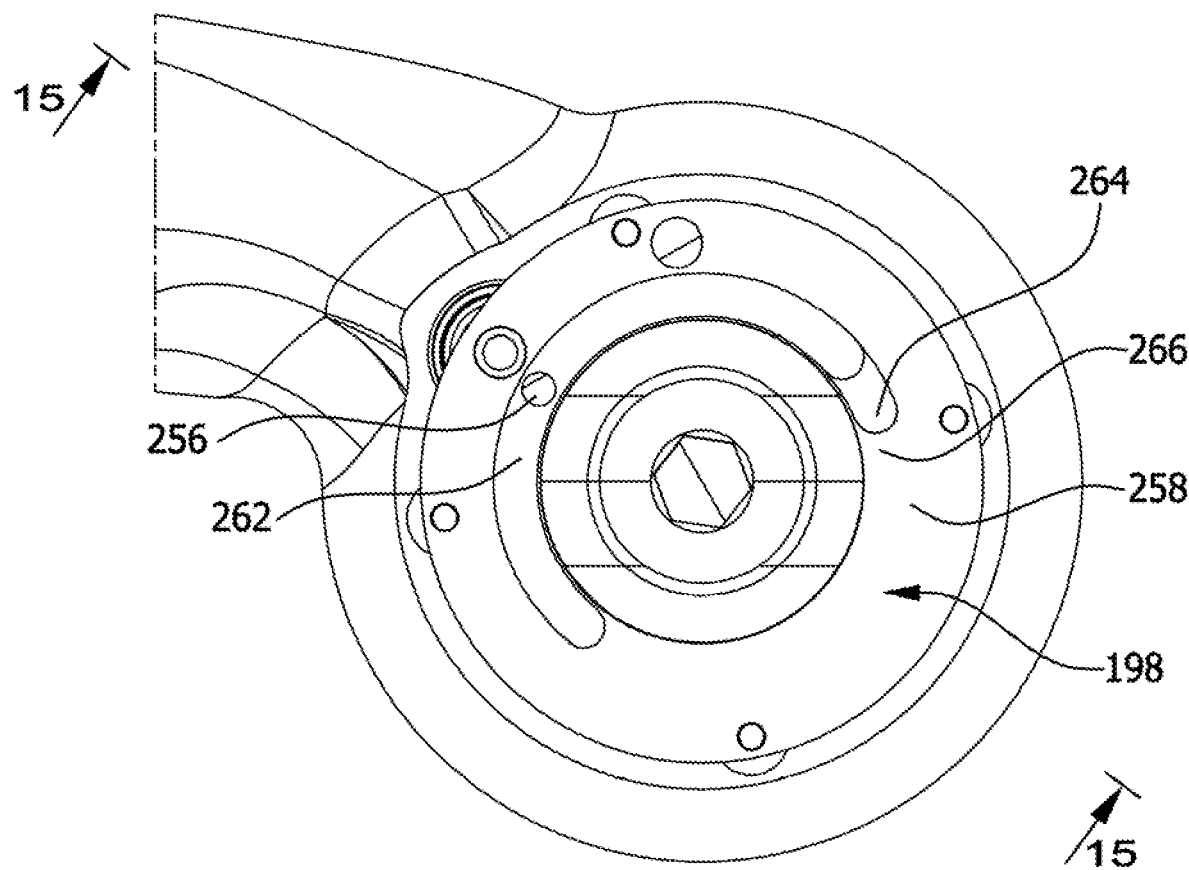
FIG. 17 shows a section along the line 17-17 in FIG. 15.

This position is illustrated for example in FIGS. 15, 16 and 17.

Figure 18:
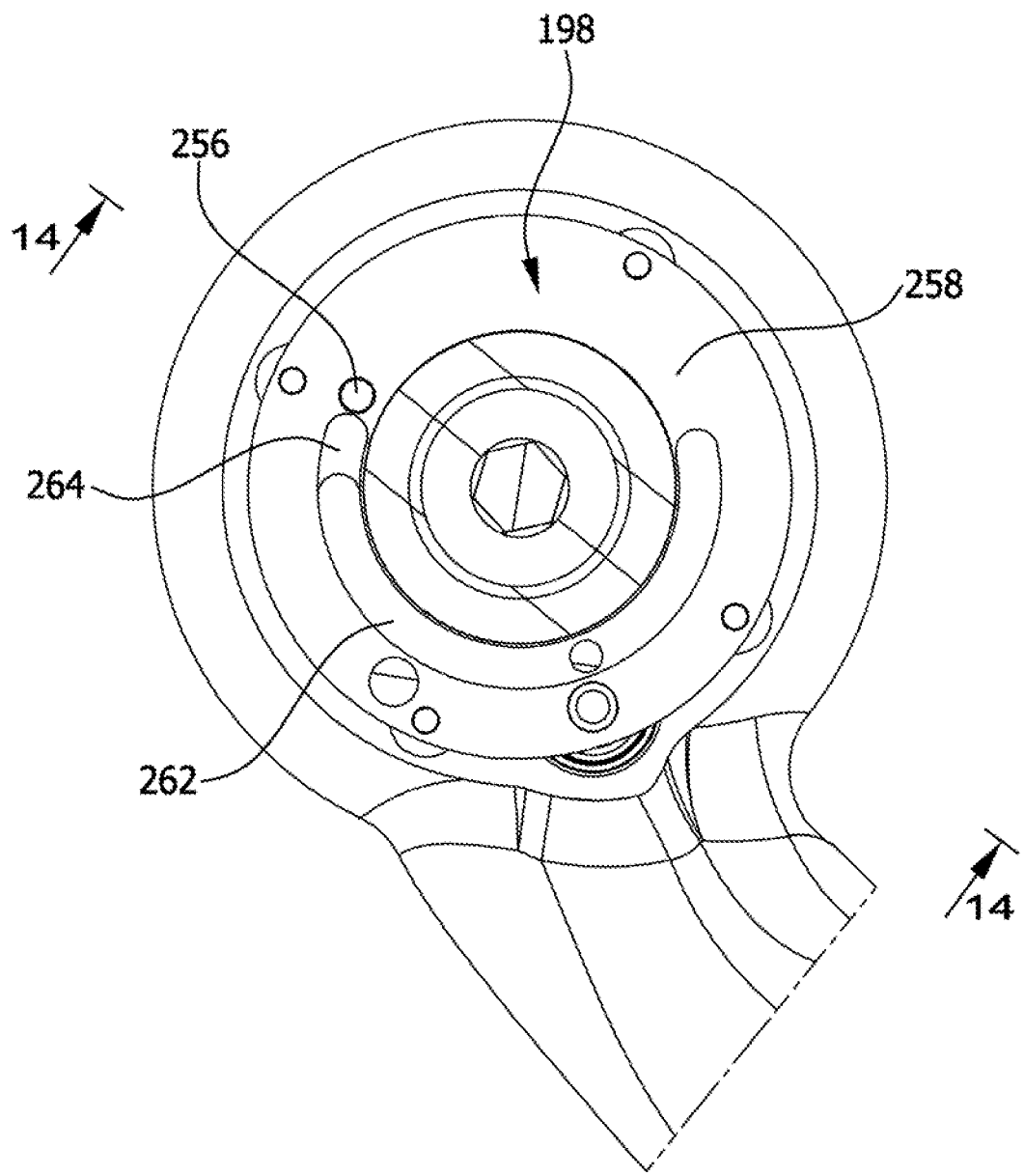
FIG. 18 shows a section alone the line 18-18 in FIG. 14.

However, so that the latching can be released for the purpose of deactivating the release position latching device 240 and the latching body 244 can be moved From the latching position into the latch release position, directly before the operative position is reached or on reaching the operative position (as illustrated in FIGS. 17 and 18) the actuation camming guide 260 moves by means of a ramp 264 for example over to a deactivation face 266 that is elevated by comparison with the activation face 262, wherein when the pivot hearing body 14 and thus also the end flange 198 rotate in the direction of the operative position A the ramp 264 urges the sensor head 256 of the sensor body 254 from the activation face 262 increasingly in the direction of the latching body 244, and thus the sensor head 254 increasingly displaces the latching body 244 out of the latching receptacle 252 in the direction of the actuation body 252, with the result that when the sensor head 256 has reached the latch release face 266 (as illustrated in FIGS. 14 and 18) the sensor head 254 has been displaced far enough in the direction of the actuation body 52 for its end face 268 opposite the sensor head 256 to be flush with the inner side 108 of the flange 104.

In this way, the release position latching device 240 of the actuation body 52 is deactivated by means of the latching body 211 when the operative position A is reached, with the result that the actuation body 52 then turns, under the action of the force of the torsion spring 114, into the rotation-blocking position and hence fixes the pivot bearing body 214 in this position in a manner preventing rotation relative to the guide body 40.

The position of the bore 242 that guides the latching body 244, the position of the latching receptacle 252, and the position of the latch release face 266 are selected such that, directly before the operative position A is reached, the sensor head 256 of the sensor body 254 reaches the latch release face 266 and thus the sensor head 254 moves the latching body 244 out of the latching receptacle 252 and hence releases latching of the actuation body 52 in the latch release position directly before or at the latest when the operative position is reached, with the result that even in the operative position A the rotation-blocking bodies 54 can engage in the receptacles 60, which in this position are arranged flush with the guide receptacles 56, and fix the pivot bearing body 14 in a manner preventing rotation relative to the guide body 40.

In the solution described above, only one set of receptacles 60 is provided for fixing the pivot bearing body 14 in the operative position A in a manner preventing rotation, whereas in the rest position R no fixing of the pivot bearing body 14 by the rotation-blocking device 50 is provided.

Figure 12:
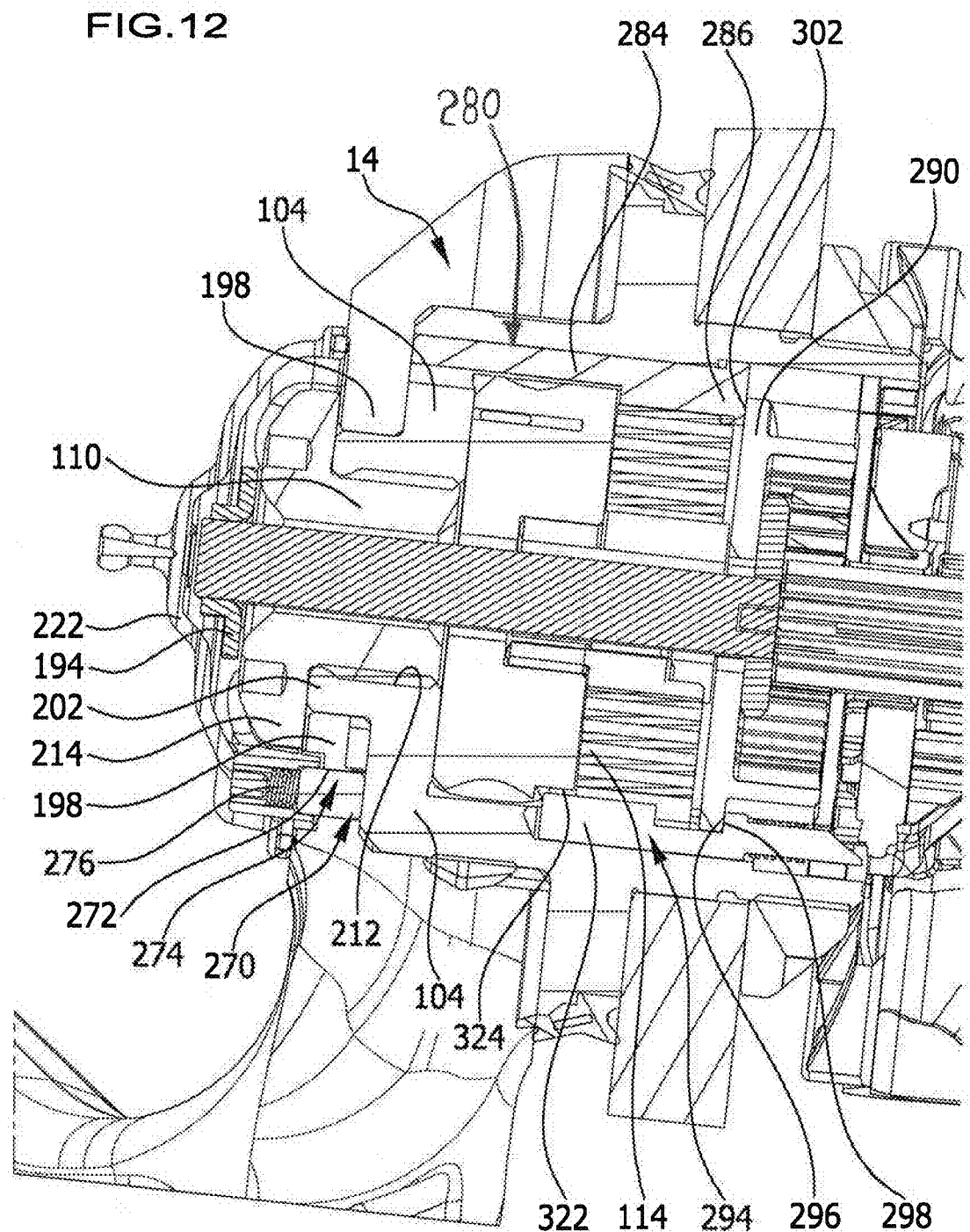
FIG. 12 shows an enlarged section according to FIG. 6, in the operative position.
Figure 13:
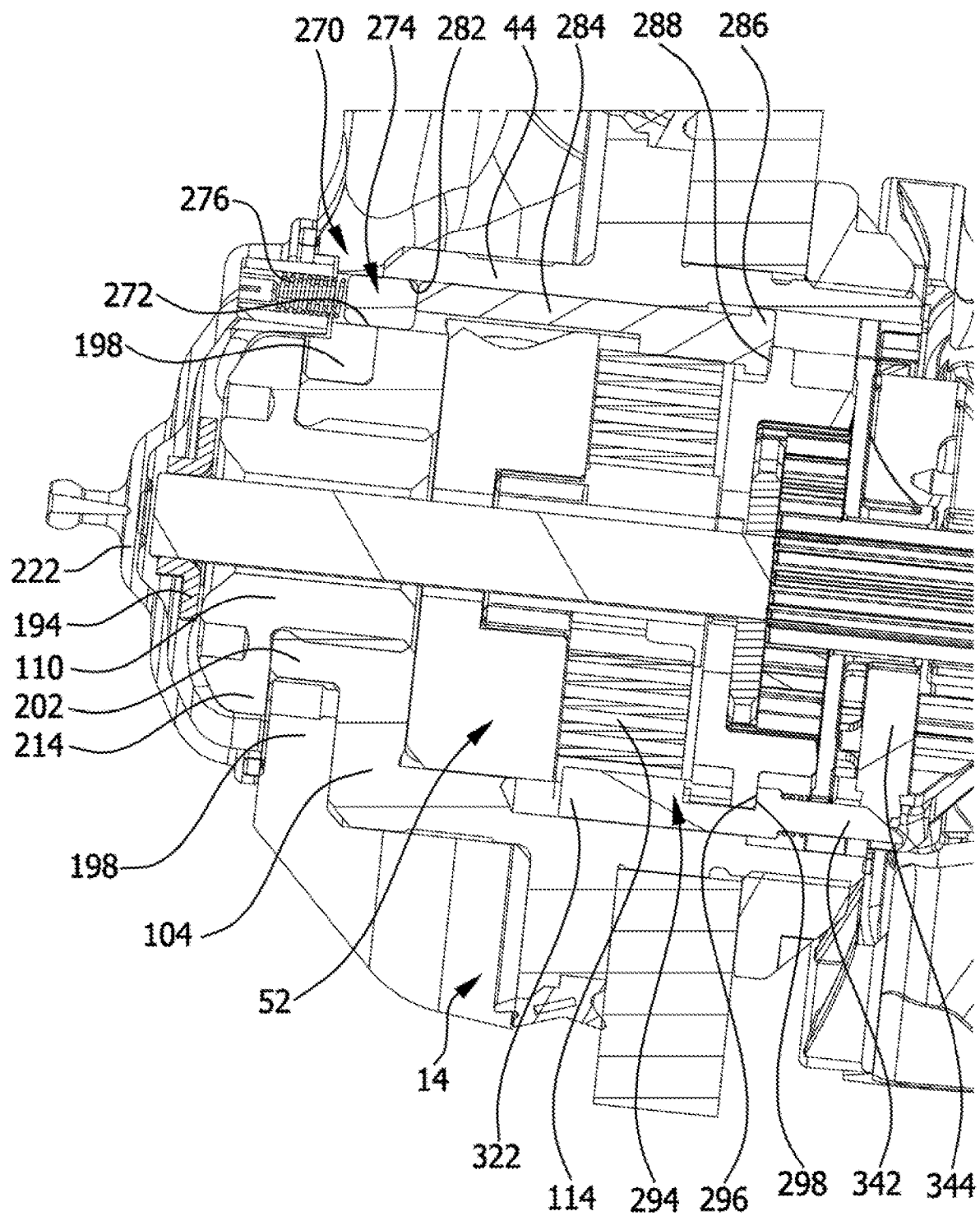
FIG. 13 shows an enlarged section similar to FIG. 12, in the rest position.

Rather, for the purpose of fixing the pivot bearing body 14 in the rest position (as illustrated in FIGS. 12 and 13), there is provided a rest position latching device 270, which has a latching body 274 that is provided in a bore 272 in the end flange 198 and is urged by the force of a spring element 276, arranged for example in the bore 272, in the direction of a latching direction parallel to the bore 272 and in the direction of the flange 144, wherein the latching body 274 abuts against the external region 200 of the flange 104 in all the rotary positions of the pivot bearing body 214 except the rest position R, and this keeps the latching body 274 in its inactive position, and wherein the latching body 274 engages in a latch receptacle 282 taking the form of a latching bore in the flange 104 only when the pivot bearing body 214 is in the rest position (FIG. 13).

For this purpose, the spring element 276 urges the latching body 276 constantly in the direction of the flange side of the flange 104 that faces the end flange 198, and thus keeps it constantly in a latching-ready position, wherein engagement of the latching body 274 in the latching receptacle 282 and thus movement from the inactive position into the active latching position are only possible once the pivot bearing body 14 has reached the rotary position corresponding to the rest position R in relation to the guide body 40 of the pivot bearing unit 20.

In order to deactivate the rest position latching device 270—that is to say in order to release the latching position of the latching body 274—there is provided in an extension of the latching receptacle 282 in the guide sleeve 44 an actuation pin 284 that uses a sensor head 286 to scan a cam track 288 that is provided on the ring gear 142 and is arranged on a cam flange 290 running peripherally and radially outside of the internal toothing 144 on the ring gear 142, and thus forms a deactivation unit 280.

FIGS. 19 to 25 show the interaction of the rotary movement of the ring gear 142, starting from a rest position that occurs in the operative position, on rotation in a direction of rotation 292, with the drive sleeve 122 for driving the actuation body 52 by means of the drive slots 156a and 156b, which are arranged in the flanged body 154 of the ring gear 142, with the drive fingers 158a, 158b engaging in these drive slots 156a, 156b, and with the sensor head 286 of the actuation pin 284 and a securing pin 294, which cooperates with a cam track 298, likewise formed by the cam flange 290, and scans this cam track 298 by means of a scanning surface 296, as explained in detail below.

In the starting position illustrated in FIG. 19, the sensor bead 286 is located on a track portion 302 of the cam track, as a result of which the actuation pin 284 (as illustrated in FIG. 12) is in a position in which it would bring about release of the latching body 274 of the rest position latching device 270 if the pivot bearing body 14 were in the rest position. Since the pivot bearing body 14 is in the operative position in FIG. 19, however, the actuation pin 284 has no effect.

If the ring gear 142 is now driven by means of the planetary gear 130, then the ring gear 142 rotates in the direction of rotation 292, and the sensor head 286 moves on a region 304 of the cam track 288 that is recessed in relation to the region 302 in the direction parallel to the pivot axis, with the result that it permits the actuation pin 284 to move if this actuation pin 284 is urged by the latching body 274, but this is not the case, with the result that the actuation pin 284 can also remain in the position predetermined by the region 302 of the cam track 288.

As can further be seen from FIG. 20a, rotation of the ring gear 142 with the cam flange 290 is performed without driving by the drive sleeve 122, since the drive slots 156a, 156b permit relative rotation of this kind by the ring gear in relation to the drive fingers 158a, 158b without entraining them.

Here, the ring gear 142 can be further rotated until the drive slots 156a, 156b) abut against the drive fingers 158a, 158b in the direction of rotation 292, wherein the sensor head 286 of the actuation pin 284 moves further in relation to the cam track 288, over the region 304 thereof, wherein the region 304 runs such that it is increasingly recessed in relation to the region 302. The fact, that the drive sleeve 122 is entrained by entrainment of the drive fingers 158a, 158b about the pivot axis now also results in rotation of the actuation body 52 in addition—as illustrated in FIG. 22—until the rotation-blocking bodies 54 can penetrate into the retraction receptacles 62 associated therewith and thus reach the release position, in which they lie in the retraction receptacles 62, with the result that the rotation-blocking device 50 is now in its release position and releases rotary movement of the pivot bearing body 14, such that this can pivot out of the operative position.

As soon as the actuation body 52 has reached the release position of the rotation-blocking device 50, the actuation bud 52 is fixed in its release position by means of the release position latching device 240, in the manner described.

Because of this fixing of the actuation body 52 in the release position by the release position latching device 240, the rotary position of the drive sleeve 122 and thus also its drive fingers 158a and 158b is also fixed, in the rotary position corresponding to the release position of the actuation body 52, which likewise corresponds to the rotary position of the ring gear 142 in FIG. 23.

In this rotary position of the ring gear 142, the actuation pin 284 is able to move far enough for the latching body 274 of the rest position latching device 270 to penetrate into the latching receptacle 282 and to be able to fix the pivot bearing body 14 in the rest position. However, this only happens once the pivot bearing body 214 has reached the rest position—as illustrated in FIG. 13.

This position is illustrated in FIG. 23, and is achieved by the ring gear 142, starting from the position in FIG. 22, rotating further in the direction of rotation 292.

In this position, the actuation pin 284 is urged by the latching body 274, with the result that the sensor head 286 is moved far enough for it to abut against the region 306 of the cam track 288, wherein this enables the actuation pin 284 to engage the latching body 274 in the latching receptacle 282.

Once the rest position of the pivot bearing body 14 has been reached, the drive for the planetary gear 130 is also switched off, with the result that the ring gear 142 remains in the position illustrated in FIG. 23, and thus also, as a result of the sensor head 286 being located on the region 306 of the cam track 288, the actuation pin 284 maintains the rest position of the pivot bearing body 214 because the latching body 274 remains in the latching receptacle as a result of the action of the spring element 276 without the actuation pin 284 acting in opposition thereto.

If the pivot bearing body 214 is to move from the rest position back into the operative position then once again the planetary gear 130 is driven, but now in the opposite direction, such that the ring gear 142 also rotates in the opposite direction of rotation—in this case in the direction of rotation 312 (FIG. 24).

Thus, the cam track 288 moves in relation to die sensor head 286 of the actuation pin 284 along the cam track 288 and into the region 302, which has the result that, because the region 304 is inclined upward from the region 306, the actuation pin 284 is displaced in the direction of the end flange 198 and thus the latching body 274 is pushed out of the latching receptacle 282, with the result that the rest position latching device 270 moves into its released position and so the pivot bearing body 214 is no longer latched in the rest position.

In this case, however, the actuation body 52 of the rotation-blocking device 50 continues to be fixed in its release position by the release position latching device 240, wherein blocking by the rotation-blocking body 52 in the release position is released in dependence on the rotary position of the pivot bearing body 14, which depends on the relative rotation of the actuation camming guide 262 in relation to the sensor body 254, which has the sensor body 256 and is arranged in the flange 104 in a manner preventing rotation, as illustrated in FIG. 18.

For example, the actuation caroming guide 262 takes a form such that, by means of the sensor body 254, it has a releasing action in a rotary position that is located between the rest position and before the operative position is reached, preferably a rotary position located in a small angular range before the operative position.

Once the release position latching device 240 has been released, the actuation body 52 performs a rotary movement as a result of the action of the torsion spring 114, such that the actuation body 52, together with the drive sleeve 122, likewise begins to rotate in the direction of rotation 312, and rotates in relation to the ring gear 142 as a result of the fact that the drive lingers 158 are movable in relation to the drive slots 156—as illustrated in FIG. 25—such that the drive fingers 158a, 158b begin to move relative to the drive slots 156a and 156b in the direction of rotation 312, in order then to arrive back in the rotary position illustrated in FIG. 19, in the operative position.

As also illustrated in FIGS. 19 to 25, the cam flange 290 of the ring gear 142 carries not only the cam track 288 for actuating the actuation pin 284 but also the securing cam track 298 for actuating the securing pin 294, illustrated in FIGS. 12 and 13 and in FIGS. 19 to 25.

Here, the securing pin 294 has a securing body 322, which, for the purpose of securing time rotary position of the actuation body 52 in the rotation-blocking position, engages in a securing recess 324 that is formed such that the actuation body 52 is unable to leave the rotation-blocking position and thus the rotation-blocking position is secured in the operative position—that is to say that locking of the pivot bearing body 214 in the operative position is also secured.

The securing pin 294, which is movable by the securing cam track 298, thus forms, together with the securing body 322 and the securing recess 324, a securing device 330.

The securing cam track 298 is preferably arranged opposite the cam track 288 on the cam flange 290, and is shaped such that, from the securing position of the securing pin 294, in which the securing body 322 engages in the securing recess 324, after the initial rotation of the ring gear 142 from the starting position in the direction of rotation 292, the securing cam track 298 already displaces the securing pin 294 far enough for the securing body 322 to come out of the securing recess 324 of the actuation body 52 in order to release the succeeding rotary movement of the actuation body 52.

For this purpose, the securing Cain track 298 is provided with a securing region 332, which enables securing of the rotation-blocking position of the actuation body 52, and a non-securing region 334, which unlocks the movement of the rotation-blocking body 25, wherein these are connected to one another by a transition region 336.

Moreover, the securing pin 294 is also provided with a projection 342, which depending on the position of the securing pin 294 actuates or does not actuate a sensing device 344, wherein for example the sensing device 344 is arranged such that in the unsecured position of the securing pin 294 it is actuated and in the securing position of the securing pin 294 it is not actuated, as can be seen from FIGS. 12 and 13.

The trailer hitch according to the invention operates as follows.

Starting from the operative position, illustrated in FIGS. 1, 2, 3 and 6, and in FIG. 7, in which rotation of the pivot bearing body 14 relative to the guide body 40 is blocked in respect of a rotary movement about the pivot axis 22 by the rotation-blocking device, in particular in that the actuation body 52 has moved the rotation-blocking bodies 54 in the guide direction 58 radially outward far enough away from the pivot axis 22 for them to engage in the receptacles 60 and hence to fix the pivot bearing body 14 such that rotation thereof relative to the guide body 40 is blocked, switching on of the drive unit has the effect that the drive gearwheel 174 is driven by the take-off gearwheel such that the drive shaft 166 drives the sun wheel 162.

This, for its part, drives the planet wheels 146, but because the pivot bearing body 14 is blocked in respect of a rotary movement about the pivot axis 22 by the rotation-blocking device 50 the planet wheels 146 are likewise blocked, with the result that the drive arms 196 of the drive body 194 cannot turn in relation to the abutment bodies 226 and 228, and consequently a rotary movement of the guide shaft 100, to which the planet wheel carrier 152 is connected in a manner preventing rotation, cannot take place either.

As a result, the ring gear 142 is driven such that it turns in the direction of rotation 292, according to FIG. 19. Initially, this rotation of the ring gear 142 has the effect of actuating the securing device 320, wherein displacement of the securing pin 294 causes the securing body 322 to come out of the securing recess 324 of the actuation body 52 and to move from the securing position into the unsecured position (FIG. 20). Further rotation of the ring gear has the result that the cam track 288 no longer acts on the sensor head 286 and so permits movement thereof in the direction away from the flange 104, as illustrated in FIG. 20 and FIG. 21, with the result that the rest position latching device 270 is activated without rotation of the actuation body 52 of the rotation-blocking device 50 already taking place.

Then, as illustrated in FIGS. 22 to 23, the drive sleeve 122, which is connected to the actuation body 52 by the projections 124 in a manner preventing rotation in relation thereto, is turned by way of the drive slots 156 and the drive fingers 158.

As a result, the ring gear 142 turns the actuation body 52 in the direction of its release position, far enough out of the rotation-blocking position for the release position to be reached and the release position latching device 240 of the actuation body 52 to become active and for this to be latched in the release position in relation to the guide body 40 in the manner described, as illustrated in FIGS. 15 and 16.

Since, when the release position is reached, rotary movement of the pivot bearing body 14 is now possible and moreover the rotary movement of the actuation body 52 in opposition to the direction of rotation 72 is blocked by the release position latching device 240, the ring gear 142 of the planetary gear 130 is stationary while the planet wheel carrier 146 now rotates, wherein the planet wheel carrier 146 is able to pivot the pivot bearing body 14 about the pivot axis 22 in the direction of the rest position R by way of the pivotal drive shaft 100 and the drive body 194 with the drive arms 196.

When the rest position R is reached, the rest position latching device 270 becomes effective, in particular because the latching body 274 is able to engage in the latching bore 282 and to displace the sensor body 254 in the direction of the cam track 288 by means of the actuation pin 294.

As a result, the pivot bearing body 14 is latched in rotary position corresponding to the rest position R of the ball neck 10 by the rest position latching device 270.

In this rest position, the drive unit is now switched off.

If the ball neck 10 is to be pivoted hack from the rest position R to the operative position A, the drive unit is operated in the opposite direction of rotation.

Since it is not possible to pivot the pivot hearing body 214, because of the operative rest position latching device 270, the planetary pear 130 drives the ring gear 142 in the direction of rotation 312, which as illustrated in FIG. 24 acts on the actuation pin 294 by means of the cam track 288 such that the actuation pin 294 deactivates the rest position latching device 270.

Since it is not possible to turn the actuation body 52, because the release position latching device is active, the planetary gear 130 brings about a rotary movement of the planet wheel carrier 152, which drives the drive body 194 having the drive arms 196 by way of the pivotal drive shaft 100, and pivoting of the pivot bearing body 14 is performed with pivoting of the ball neck 10 in the direction of the operative position A.

Directly before the operative position A is reached, the release position latching device 240 is deactivated in the manner described, as illustrated for example in FIG. 18—that is to say that it moves from the latching position into the latch release position, and thus the actuation body 52 is released for the purpose of movement in the direction of rotation 72 under the action of the torsion spring 114 in the direction of the rotation-blocking position, wherein the rotation-blocking bodies 54 are pushed outward into the receptacles 60 by the actuation body 52, radially in relation to the pivot axis 22, and thus in turn result in a blocking of rotation of the pivot bearing body 14 in relation to the guide body 40.

In this locked position of the pivot bearing body 14 in relation to the guide body 40, a rotary movement of the planet wheel carrier 152 is for its part blocked, with the result that the ring gear 142 is rotated further, into the starting position illustrated in FIG. 19, in which the actuation body 52 can perform a further rotary movement in the direction of rotation 72 under the action of the torsion spring 114, with the result that the nine gear 142 in the operative position A does not impede later adjustment by rotating the actuation body 52 further in the direction of rotation 72 under the action of the torsion spring 114.

The invention claimed is:

1. A trailer hitch, comprising a ball neck, which is movable between an operative position and a rest position and has a pivot bearing body arranged at a first end and a trailer ball arranged at a second end, a pivot bearing unit, which is arranged fixed to the vehicle and by means of which the pivot bearing body is received such that it is pivotal about a pivot axis between the operative position and the rest position, and a rotation-blocking device having at least two rotation-blocking bodies that are guided such that they are movable in a guide direction by means of a guide body, wherein, in the operative position, the rotation-blocking bodies are configured to be brought into a rotation-blocking position by moving in the guide direction and, in this position, engage with a respective receptacle in the pivot bearing body in order to block a pivotal movement of the pivot bearing body about the pivot axis in relation to the guide body, and are configured to be brought into a release position and, in this position, are disengaged from the respective receptacle, and wherein the rotation-blocking device has an actuation body, which has a respective pressure surface extending transversely to the guide direction for each of the rotation-blocking bodies and of which the movement in an actuation direction causes the at least two rotation-blocking bodies to be movable and urgeable in the guide direction,
wherein a rest position latching device that is independent of the rotation-blocking device is provided, which, in an inactive position, permits movement of the pivot bearing body relative to the pivot bearing unit and, in a latching position, fixes the pivot bearing body such that it cannot rotate in relation to the pivot bearing unit, and
wherein a deactivation unit is provided by means of which the rest position latching device is deactivated independently of the pivotal movement of the pivot bearing body.

2. The trailer hitch as claimed in claim 1, wherein the rest position latching device of itself moves into the latching position when the pivot bearing body reaches the rotary position corresponding to the rest position, as a result of a spring element provided therein.

3. The trailer hitch as claimed in claim 1, wherein, when the rest position latching device is not in the latching position, it is always in a latching-ready position.

4. The trailer hitch as claimed in claim 1, wherein the rest position latching device is configured to be deactivated by means of the deactivation unit, in dependence on a certain functional condition of the trailer hitch.

5. The trailer hitch as claimed in claim 4, wherein the rest position latching device is configured to be deactivated by means of the deactivation unit before the pivot bearing body is pivoted from the rest position into the operative position.

6. The trailer hitch as claimed in claim 1, wherein the rest position latching device is configured to be deactivated by means of the deactivation unit by a drive unit that cooperates with the deactivation unit.

7. The trailer hitch as claimed in claim 1, wherein there is provided a distribution gear that is drivable by means of a drive element and which has a first take-off element, by means of which the pivotal movement of the pivot bearing body with the ball neck is driven, and a second take-off element, which cooperates with the deactivation unit for the purpose of deactivating the rest position latching device.

8. The trailer hitch as claimed in claim 7, wherein the distribution gear couples the drive element to the first take-off element or the second take-off element automatically.

9. The trailer hitch as claimed in claim 7, wherein the distribution gear is an epicyclic gear, in particular a planetary gear.

10. The trailer hitch as claimed in claim 7, wherein the drive element of the distribution gear is driven by means of the in particular electrically operated drive unit.

11. The trailer hitch as claimed in claim 1, wherein the rest position latching device comprises a latching body that is arranged in the pivot bearing body or the pivot bearing unit, is movable in a latching direction, and is configured to be brought into engagement with a latching receptacle arranged in the pivot bearing unit or the pivot bearing body.

12. The trailer hitch as claimed in claim 11, wherein the latching body that is movable in the latching direction is arranged in the pivot bearing body, and in that the latching receptacle is arranged in the pivot bearing unit.

13. The trailer hitch as claimed in claim 11, wherein the latching direction extends parallel to the pivot axis.

14. The trailer hitch as claimed in claim 11, wherein there is associated with the latching receptacle an actuation body of the deactivation unit that, when the deactivation unit is active, expels the latching body from the latching receptacle.

15. The trailer hitch as claimed in claim 1, wherein the rotation-blocking bodies are arranged around the actuation body.

16. The trailer hitch as claimed in claim 1, wherein the actuation body is arranged such that it is rotatable about the pivot axis, and in particular has wedge faces that extend over an angular range about the pivot axis and vary in a line parallel with the guide direction.

17. The trailer hitch as claimed in claim 1, wherein at least one component of the guide direction extends in the radial direction in relation to the pivot axis.

18. The trailer hitch as claimed in claim 1, wherein the rotation-blocking body is guided by the guide body, which radially adjoins the pivot bearing body.

19. The trailer hitch as claimed in claim 1, wherein the guide body has a guide sleeve with the guide receptacle for the respective rotation-blocking body.

20. The trailer hitch as claimed in claim 1, wherein the guide body guides the actuation body movably.

21. The trailer hitch as claimed in claim 1, wherein the guide body forms a pivot bearing for the pivot bearing body.

22. The trailer hitch as claimed in claim 1, wherein the guide body is part of the pivot bearing unit that is arranged fixed to the vehicle.

23. The trailer hitch as claimed in claim 1, wherein the actuation body is surrounded by the guide body, and in that in particular the pivot bearing body embraces the guide body.

24. The trailer hitch as claimed in claim 1, wherein the pivot bearing body forms an outer body that outwardly surrounds the pivot bearing unit and is arranged to be non-displaceable in the direction of the pivot axis in relation to the pivot bearing unit, and in that in particular the first end of the ball neck is attached to the outer body.

25. The trailer hitch as claimed in claim 1, wherein the pivot bearing body forms an outer body that outwardly surrounds a sub-region of the rotation-blocking unit and that is arranged to be non-displaceable in the direction of the pivot axis in relation to the guide body.

26. The trailer hitch as claimed in claim 1, wherein the actuation body is urged in the direction of its rotation-blocking position by an elastic energy storage system.

27. The trailer hitch as claimed in claim 1, wherein the actuation body is movable from the rotation-blocking position into the release position by an actuation device.

28. The trailer hitch as claimed in claim 26, wherein the actuation body is movable by the actuation device in opposition to urging by the energy storage system.

29. The trailer hitch as claimed in claim 26, wherein the actuation body is configured to be turned by the actuation device in opposition to the direction of rotation brought about by the energy storage system.

30. The trailer hitch as claimed in claim 1, wherein the actuation device has a take-off element that is coupled to the actuation body.

31. The trailer hitch as claimed in claim 30, wherein the take-off element and the actuation body are coupled to one another by way of an entraining coupling device.

32. The trailer hitch as claimed in claim 31, wherein the entraining coupling device has an entrainment-free release condition and an entrained condition.

33. The trailer hitch as claimed in claim 1, wherein the actuation device comprises a motorized drive unit for the rotation-blocking device.

34. The trailer hitch as claimed in claim 1, wherein the motorized drive unit is also provided as a pivotal drive for performing the pivotal movement of the pivot bearing body.

35. The trailer hitch as claimed in claim 1, wherein a first take-off element for driving the rotation-blocking device and a second take-off element for driving the pivotal movement of the pivot bearing body are coupled by an epicyclic gear.

36. The trailer hitch as claimed in claim 35, wherein the epicyclic gear is drivable by a single motorized drive unit.

37. The trailer hitch as claimed in claim 35, wherein the first take-off element of the epicyclic gear acts as a pivotal drive on the pivot bearing body for the purpose of pivoting the ball neck between the operative position and the rest position, and in that the second take-off element of the epicyclic gear acts as an actuating drive on the actuation body in order to move it from the rotation-blocking position into the release position.

38. The trailer hitch as claimed in claim 37, wherein the epicyclic gear enables alternation between the take-off element for actuating the rotation-blocking device and the take-off element for performing the pivotal movement of the pivot bearing body.

39. The trailer hitch as claimed in claim 35, wherein the pivotal movement or the rotation-blocking device is driven in dependence on restraint of the take-off element for the rotation-blocking device or the pivotal movement of the pivot bearing body.

40. The trailer hitch as claimed in claim 35, wherein the epicyclic gear is arranged coaxially in relation to the pivot axis.

41. The trailer hitch as claimed in claim 35, wherein the epicyclic gear is arranged on a side of the actuation element that faces the motorized drive.

42. The trailer hitch as claimed in claim 35, wherein, as seen in the direction of the pivot axis, the epicyclic gear is driven on one side by the motorized drive unit and on the opposite side has a take-off for the actuation element.

43. The trailer hitch as claimed in claim 35, wherein the epicyclic gear is arranged, as seen in the direction of the pivot axis, between the motorized drive unit and the actuation element.

44. The trailer hitch as claimed in claim 35, wherein the epicyclic gear, the elastic energy storage system and the actuation element are arranged to succeed one another in the direction of the pivot axis.

45. The trailer hitch as claimed in claim 1, wherein the actuation body is blockable in its rotation-blocking position by a securing device.

46. The trailer hitch as claimed in claim 45, wherein the actuation body is blockable, by the securing device, to prevent its reaching its release position.

47. The trailer hitch as claimed in claim 1, wherein there is provided a release position latching device that, in a release position of the actuation body, is movable between a latch release position, which releases movement of the actuation body in relation to the guide body, and a latching position, which fixes the actuation body in relation to the guide body, and, at least in the release position of the actuation body, is urged in the direction of the latching position by a spring element.

48. The trailer hitch as claimed in claim 47, wherein, in the release position of the actuation body, the release position latching device moves automatically into the latching position once the pivot bearing body has left the rotary position corresponding to the operative position.

49. The trailer hitch as claimed in claim 47, wherein, when at least one functional position of the trailer hitch is reached, the release position latching device moves from the latching position into the latch release position.

50. The trailer hitch as claimed in claim 47, wherein the release position latching device moves from the latching position into the latch release position, depending on at least one particular rotary position of the pivot bearing body.

51. The trailer hitch as claimed in claim 49, wherein the release position latching device moves from the latching position into the latch release position when at least one predetermined rotary position of the pivot bearing body is reached.

52. The trailer hitch as claimed in claim 50, wherein the release position latching device moves from the latching position into the latch release position under mechanical control when the at least one predetermined rotary position of the pivot bearing body is reached.

53. The trailer hitch as claimed in claim 47, wherein the release position latching device is provided for the purpose of restraining the take-off element for the rotation-blocking device.

54. The trailer hitch as claimed in claim 47, wherein the release position latching device comprises a latching body, which is guided in a latching direction in the actuation body or the pivot bearing unit, and a latching receptacle, which is provided in the pivot bearing unit or the actuation body and in which the latching body engages in the latching position and from which the latching body disengages in the latch release position.

55. The trailer hitch as claimed in claim 54, wherein the latching body is arranged in the actuation body such that it is guided in the latching direction, and the latching receptacle is arranged in the guide body.

56. The trailer hitch as claimed in claim 54, wherein there is associated with the latching receptacle a sensor body, which detects that rotary positions of the pivot bearing body in relation to the guide body are adopted.

57. The trailer hitch as claimed in claim 56, wherein the sensor body uses a sensor head to scan a scannable actuation camming guide that is arranged on the pivot bearing body and is configured to be entrained with the pivot bearing body, for the purpose of detecting the individual rotary positions of the pivot bearing body.

58. The trailer hitch as claimed in claim 56, wherein, in at least one predetermined rotary position of the pivot bearing body, the sensor body expels the latching body from the latching receptacle.

59. The trailer hitch as claimed in claim 54, wherein the latching body is movable in a latching direction that extends parallel to the pivot axis.

* * * * *